(12) United States Patent
Jung

(10) Patent No.: US 12,081,089 B2
(45) Date of Patent: Sep. 3, 2024

(54) MOTOR APPARATUS

(71) Applicant: HYUNDAI MOBIS CO., LTD., Seoul (KR)

(72) Inventor: Jae Woo Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 17/735,064

(22) Filed: May 2, 2022

(65) Prior Publication Data

US 2022/0263366 A1    Aug. 18, 2022

Related U.S. Application Data

(62) Division of application No. 16/701,060, filed on Dec. 2, 2019, now abandoned.

(30) Foreign Application Priority Data

Jan. 8, 2019  (KR) .................. 10-2019-0002109

(51) Int. Cl.
| | |
|---|---|
| H02K 3/28 | (2006.01) |
| H02K 1/278 | (2022.01) |
| H02K 7/06 | (2006.01) |
| H02K 21/14 | (2006.01) |
| F16H 25/20 | (2006.01) |
| F16H 25/22 | (2006.01) |

(52) U.S. Cl.
CPC .............. *H02K 3/28* (2013.01); *H02K 1/278* (2013.01); *H02K 7/06* (2013.01); *H02K 21/14* (2013.01); *F16H 2025/2062* (2013.01); *F16H 25/2204* (2013.01); *H02K 2213/06* (2013.01)

(58) Field of Classification Search
CPC ............ H02K 3/28; H02K 1/278; H02K 7/06; H02K 21/14; H02K 2213/06; H02K 21/16; H02K 3/20; H02K 1/14; H02K 1/27; H02K 2213/03; F16H 25/2204; F16H 2025/2062
USPC ......................................... 310/198
See application file for complete search history.

(56) References Cited

U.S. PATENT DOCUMENTS

| | | | |
|---|---|---|---|
| 7,579,729 B2 | 8/2009 | Takashima et al. | |
| 9,472,988 B2 * | 10/2016 | Sonoda | H02K 3/522 |
| 10,404,124 B2 | 9/2019 | Ikeda et al. | |
| 2006/0022544 A1 | 2/2006 | Kinashi | |
| 2007/0296292 A1 | 12/2007 | Kienzler et al. | |

(Continued)

FOREIGN PATENT DOCUMENTS

| | | |
|---|---|---|
| CN | 108141087 | 6/2018 |
| JP | 2012-222963 | 11/2012 |

(Continued)

OTHER PUBLICATIONS

Non-Final Office Action dated Mar. 8, 2023, issued to U.S. Appl. No. 16/701,060.

(Continued)

*Primary Examiner* — Alexander A Singh
(74) *Attorney, Agent, or Firm* — NSIP Law

(57) ABSTRACT

A motor apparatus including a stator having a plurality of teeth formed in a circumference thereof, a rotor rotatably installed in the stator, and having a plurality of magnets disposed in a circumference thereof, and a 3-phase coil part having a plurality of coils wound around the teeth, respectively, in which the coils having a preset phase difference are arranged in parallel.

1 Claim, 20 Drawing Sheets

<14POLE 18SLOT>

(56) References Cited

U.S. PATENT DOCUMENTS

| | | | |
|---|---|---|---|
| 2012/0262014 A1 | 10/2012 | Katou et al. | |
| 2018/0248432 A1* | 8/2018 | Ikeda | H02K 11/33 |
| 2019/0245471 A1* | 8/2019 | Nigo | H02P 25/18 |
| 2020/0136448 A1* | 4/2020 | Qiao | H02K 1/146 |
| 2020/0220407 A1* | 7/2020 | Jung | H02K 7/06 |
| 2020/0350791 A1* | 11/2020 | Le | H02K 7/085 |
| 2022/0263366 A1* | 8/2022 | Jung | H02K 3/28 |
| 2022/0263367 A1 | 8/2022 | Jung | |

FOREIGN PATENT DOCUMENTS

| | | |
|---|---|---|
| KR | 10-2007-0091514 | 9/2007 |
| KR | 10-2014-0066404 | 6/2014 |
| WO | 2011/148527 | 12/2011 |

OTHER PUBLICATIONS

Non-Final Office Action dated Jun. 21, 2022, issued to U.S. Appl. No. 16/701,060.
Final Office Action dated Jun. 28, 2023, issued to U.S. Appl. No. 16/701,060.
Office Action dated Aug. 14, 2020 for Korean Patent Application No. 10-2019-0002109.
Non-Final Office Action mailed Oct. 22, 2021, in U.S. Appl. No. 16/701,060.
Final Office Action mailed Feb. 4, 2022, in U.S. Appl. No. 16/701,060.
Final Office Action dated Oct. 6, 2022, issued to U.S. Appl. No. 16/701,060.
Non-Final Office Action dated Feb. 2, 2024, issued to U.S. Appl. No. 17/735,072.

* cited by examiner

<10POLE 12SLOT>

|  | U | V | W |
|---|---|---|---|
|  | SERIES | SERIES | SERIES |
| PARALLEL | 1-7 | 3-9 | 5-11 |
|  | 2-8 | 4-10 | 6-12 |

<14POLE 18SLOT>

| SELF BRAKING | U | V | W |
|---|---|---|---|
| | SERIES | SERIES | SERIES |
| | 1-10 | 2-11 | 4-13 |
| PARALLEL | 5-14 | 3-12 | 8-17 |
| | 6-15 | 7-16 | 9-18 |

<14POLE 12SLOT>

|  | U | V | W |
|---|---|---|---|
|  | SERIES | SERIES | SERIES |
| PARALLEL | 1-7 | 3-9 | 5-11 |
|  | 2-8 | 4-10 | 6-12 |

<16POLE 18SLOT>

| SELF BRAKING | U | V | W |
| --- | --- | --- | --- |
| | SERIES | SERIES | SERIES |
| PARALLEL | 1-10 | 3-12 | 6-15 |
| | 2-11 | 4-13 | 7-16 |
| | 9-18 | 5-14 | 8-17 |

<10POLE 12SLOT>

| | U | V | W |
|---|---|---|---|
| PARALLEL | 1 | 3 | 5 |
| | 2 | 4 | 6 |
| | 7 | 9 | 11 |
| | 8 | 10 | 12 |

<14POLE 18SLOT>

FIG. 20

| SELF BRAKING | U | V | W |
|---|---|---|---|
| PARALLEL | 1 | 2 | 4 |
| | 5 | 3 | 8 |
| | 6 | 7 | 9 |
| | 10 | 11 | 13 |
| | 14 | 12 | 17 |
| | 15 | 16 | 18 |

<14POLE 12SLOT>

| SELF BRAKING | U | V | W |
|---|---|---|---|
| PARALLEL | 1 | 3 | 5 |
| | 2 | 4 | 6 |
| | 7 | 9 | 11 |
| | 8 | 10 | 12 |

<16POLE 18SLOT>

FIG. 26

| SELF BRAKING | U | V | W |
|---|---|---|---|
| PARALLEL | 1 | 3 | 6 |
| | 2 | 4 | 7 |
| | 9 | 5 | 8 |
| | 10 | 12 | 15 |
| | 11 | 13 | 16 |
| | 18 | 14 | 17 |

MOTOR APPARATUS

CROSS-REFERENCE TO RELATED APPLICATION

This application is a Divisional of U.S. patent application Ser. No. 16/701,060, filed on Dec. 2, 2019, which claims priority from and the benefit of Korean Patent Application No. 10-2019-0002109, filed on Jan. 8, 2019, which are hereby incorporated by reference for all purposes as if set forth herein.

BACKGROUND

Field

Exemplary embodiments relate to a motor apparatus, and more particularly, to a motor apparatus which can reduce a counter rotating speed in case of a failure of an electrical system.

Discussion of the Background

In general, a motor apparatus is installed in various devices, which require a driving force. The motor apparatus has a rotating shaft rotated by a rotational force of a rotor.

The motor apparatus is installed in an electric booster of a vehicle. In general, a pedal cylinder is connected to the electric booster, and a pedal is connected to the pedal cylinder. A screw is connected to the motor apparatus of the electric booster, a transfer nut is connected to the screw, and a pushrod is connected to the transfer nut. The pushrod is connected to a piston of a master cylinder. A screw stopper is installed on the screw and the transfer nut. As the screw is rotated by the motor apparatus, the transfer nut is transferred and moves the pushrod to pressurize the master cylinder.

In a conventional electrical system, however, a failure of the electrical system may occur due to a software error or damage to a switching element of an ECU (Electronic Control Unit). When an output of the motor apparatus is not generated during the failure of the electrical system, hydraulic pressure of the master cylinder pushes the piston to counter-rotate the screw. The counter-rotating of the screw moves the transfer nut toward the motor apparatus at high speed. In this case, as the stoppers of the transfer nut and the screw collide with each other, the stoppers may be damaged.

As the transfer nut is moved toward the motor apparatus, a ball screw and a shaft are counter-rotated, and the counter-rotating of the shaft causes the motor apparatus to generate a counter electromotive force. Therefore, the ECU may be damaged by the counter electromotive force generated in the motor apparatus.

Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention provide a motor apparatus which can reduce a counter rotating speed in case of a fail of an electrical system.

Additional features of the invention will be set forth in the description which follows, and in part will be apparent from the description, or may be learned by practice of the invention.

A motor apparatus according to an exemplary embodiment includes a stator having a plurality of teeth formed in a circumference thereof, a rotor rotatably installed in the stator, and having a plurality of magnets disposed in a circumference thereof, and a 3-phase coil part having a plurality of coils wound around the teeth, respectively, in which the coils having a preset phase difference are arranged in parallel.

The 3-phase coil part may include a U-phase coil, a V-phase coil, and a W-phase coil, the U-phase coil may include first groups of the coils having a first phase difference arranged in parallel, each of the first groups including the coils having the same phase difference arranged in series, the V-phase coil may include second groups of the coils having a second phase difference arranged in parallel, each of the second groups including the coils having the same phase difference arranged in series, and the W-phase coil may include third groups of the coils having a third phase difference arranged in parallel, each of the third groups including the coils having the same phase difference arranged in series.

The first phase difference may be 20° to 30°, and the coils in each of the first groups mechanically may have an angle difference of 180° therebetween and be electrically in-phase, the second phase difference may be 20° to 30°, and the coils in each of the second groups mechanically may have an angle difference of 180° therebetween and be electrically in-phase, and the third phase difference may be 20° to 30°, and the coils in each of the third groups mechanically may have an angle difference of 180° therebetween and be electrically in-phase.

The rotor may include 10-pole magnets, and the stator may include 12 coils.

The first groups may include a first coil and a seventh coil wound in series, a second coil and an eighth coil wound in series, such that the first-seventh coil set and the second-eighth coil set are arranged in parallel, the second groups may include a third coil and a ninth coil would in series, and a fourth coil and a tenth coil wound in series, such that the third-ninth coil set and the fourth-tenth coil set are arranged in parallel, and the third groups may include a fifth coil and an eleventh coil wound in series, and a sixth coil and a twelfth coil would in series, such that the fifth-eleventh coil set and the sixth-twelfth coil set are arranged in parallel.

The rotor may include 14-pole magnets, and the stator may include 18 coils.

The first groups may include a first coil and a tenth coil wound in series, a fifth coil and a fourteenth coil wound in series, and a sixth coil and a fifteenth coil wound in series, such that the first-tenth coil set, the fifth-fourteenth coil set, and the sixth-fifteenth coil set are arranged in in parallel, the second groups may include a second coil and an eleventh coil wound in series, a third coil and a twelfth coil wound in series, and a seventh coil and a sixteenth coil wound in series, such that the second-eleventh coil set, the third-twelfth coil set, and the seventh-sixteenth coil set are arranged in parallel, and the third groups may include a fourth coil and a thirteenth coil wound in series, an eighth coil and a seventeenth coil wound in series, and a ninth coil and an eighteenth coil wound in series, such that the fourth-thirteenth coil set, the eighth-seventeenth coil set, and the ninth-eighteenth coil set are arranged in parallel.

The rotor may include 14-pole magnets, and the stator may include 12 coils.

The first groups may include a first coil and a seventh coil wound in series, and a second coil and an eighth coil wound in series, such that the first-seventh coil set and the second-eighth coil set are arranged in parallel, the second groups may include a third coil and a ninth coil wound in series, and a fourth coil and a tenth coil wound in series, such that the third-ninth coil set and the fourth-tenth coil set are arranged in parallel, and the third groups may include a fifth coil and an eleventh coil wound in series, and a sixth coil and a twelfth coil wound in series, such that the fifth-eleventh coil set and the sixth-twelfth coil set are arranged in parallel.

The rotor may include 16-pole magnets, and the stator may include 18 coils.

The first groups may include a first coil and a tenth coil wound in series, a second coil and an eleventh coil wound in series, and a ninth coil and an eighteenth coil wound in series, such that the first-tenth coil set, the second-eleventh coil set, and the ninth-eighteenth coil set are arranged in parallel, the second groups may include a third coil and a twelfth coil wound in series, a fourth coil and a thirteenth coil wound in series, and a fifth coil and a fourteenth coil wound in series, such that the third-twelfth coil set, the fourth-thirteenth coil set, and the fifth-fourteenth coil set are arranged in parallel, and the third groups may include a sixth coil and a fifteenth coil wound in series, a seventh coil and a sixteenth coil wound in series, and an eighth coil and a seventeenth coil wound in series, such that the sixth-fifteenth coil set, the seventh-sixteenth coil set, and the eighth-seventeenth coil set are arranged in in parallel.

The 3-phase coil part may include a U-phase coil, a V-phase coil, and a W-phase coil, the U-phase coil may include first groups of coils having a first phase difference arranged in parallel, the first groups including the coils that mechanically have an angle difference of 180° therebetween, are electrically in-phase, and are arranged in parallel, the V-phase coil may include second groups of coils having a second phase difference arranged in parallel, the second groups including the coils that mechanically have an angle difference of 180° therebetween, are electrically in-phase, and are arranged in parallel, and the W-phase coil may include third groups of coils having a third phase difference arranged in parallel, the third groups including the coils that mechanically have an angle difference of 180° therebetween, are electrically in-phase, and are arranged in parallel.

The first phase difference may be 20° to 30°, and the coils in the first groups may have a phase difference of 180° and be arranged in parallel, the second phase difference may be 20° to 30°, and the coils in the second groups may have a phase difference of 180° and be arranged in parallel, and the third phase difference may be 20° to 30°, and the coils in the third groups may have a phase difference of 180° and be arranged in parallel.

The rotor may include 10-pole magnets, and the stator may include 12 coils.

The U-phase coil may include a first coil, a second coil, a seventh coil, and an eighth coil wound in parallel, the V-phase coil may include a third coil, a fourth coil, a ninth coil, and a tenth coil wound in parallel, and the W-phase coil may include a fifth coil, a sixth coil, an eleventh coil, and a twelfth coil wound in parallel.

The rotor may include 14-pole magnets, and the stator may include 18 coils.

The U-phase coil may include a first coil, a fifth coil, a sixth coil, a tenth coil, a fourteenth coil, and a fifteenth coil wound in parallel, the V-phase coil may include a second coil, a third coil, a seventh coil, an eleventh coil, a twelfth coil, and a sixteenth coil wound in parallel, and the W-phase coil may include a fourth coil, an eighth coil, a ninth coil, a thirteenth coil, a seventeenth coil, and an eighteenth coil wound in parallel.

The rotor may include 14-pole magnets, and the stator may include 12 coils.

The U-phase coil may include a first coil, a second coil, a seventh coil, and an eighth coil wound in parallel, the V-phase coil may include a third coil, a fourth coil, a ninth coil, and a tenth coil wound in parallel, and the W-phase coil may include a fifth coil, a sixth coil, an eleventh coil, and a twelfth coil wound in parallel.

The rotor may include 16-pole magnets, and the stator may include 18 coils, the U-phase coil may include a first coil, a second coil, a ninth coil, a tenth coil, an eleventh coil, and an eighteenth coil wound in parallel, the V-phase coil may include a third coil, a fourth coil, a fifth coil, a twelfth coil, a thirteenth coil, and a fourteenth coil wound in parallel, and the W-phase coil may include a sixth coil, a seventh coil, an eighth coil, a fifteenth coil, a sixteenth coil, and a seventeenth coil wound in parallel It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 20 is a table schematically illustrating the connection state of the 3-phase coil part in the motor apparatus in accordance with the sixth exemplary embodiment of the disclosure.

FIG. 26 is a table schematically illustrating the connection state of the 3-phase coil part in the motor apparatus in accordance with the eighth exemplary embodiment of the disclosure.

DETAILED DESCRIPTION OF THE ILLUSTRATED EMBODIMENTS

Figure 1:
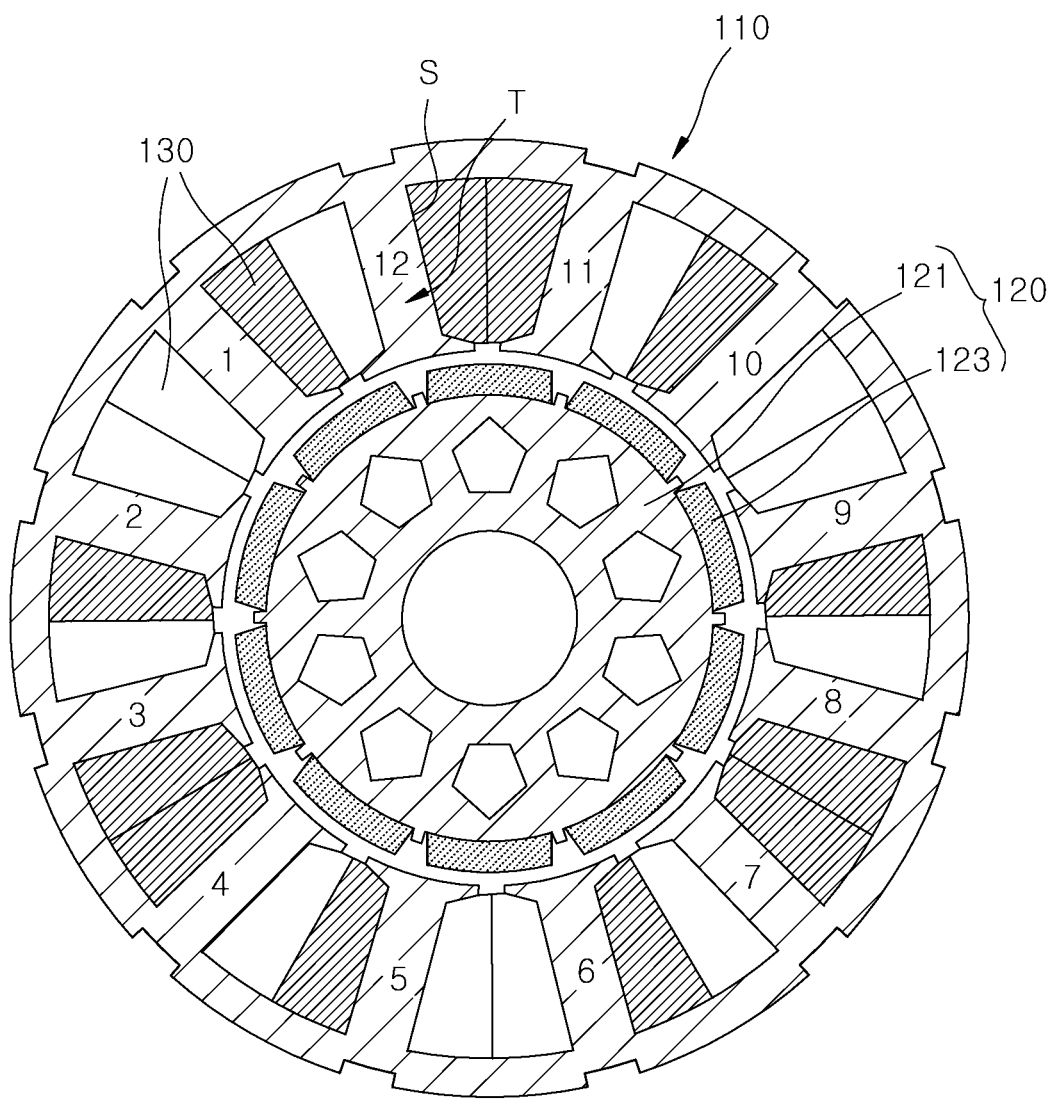
FIG. 1 is a configuration diagram schematically illustrating a motor apparatus in accordance with a first exemplary embodiment of the disclosure.

The invention is described more fully hereinafter with reference to the accompanying drawings, in which embodiments of the invention are shown. This invention is may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

First, a motor apparatus in accordance with a first exemplary embodiment of the disclosure will be described.

Figure 2:
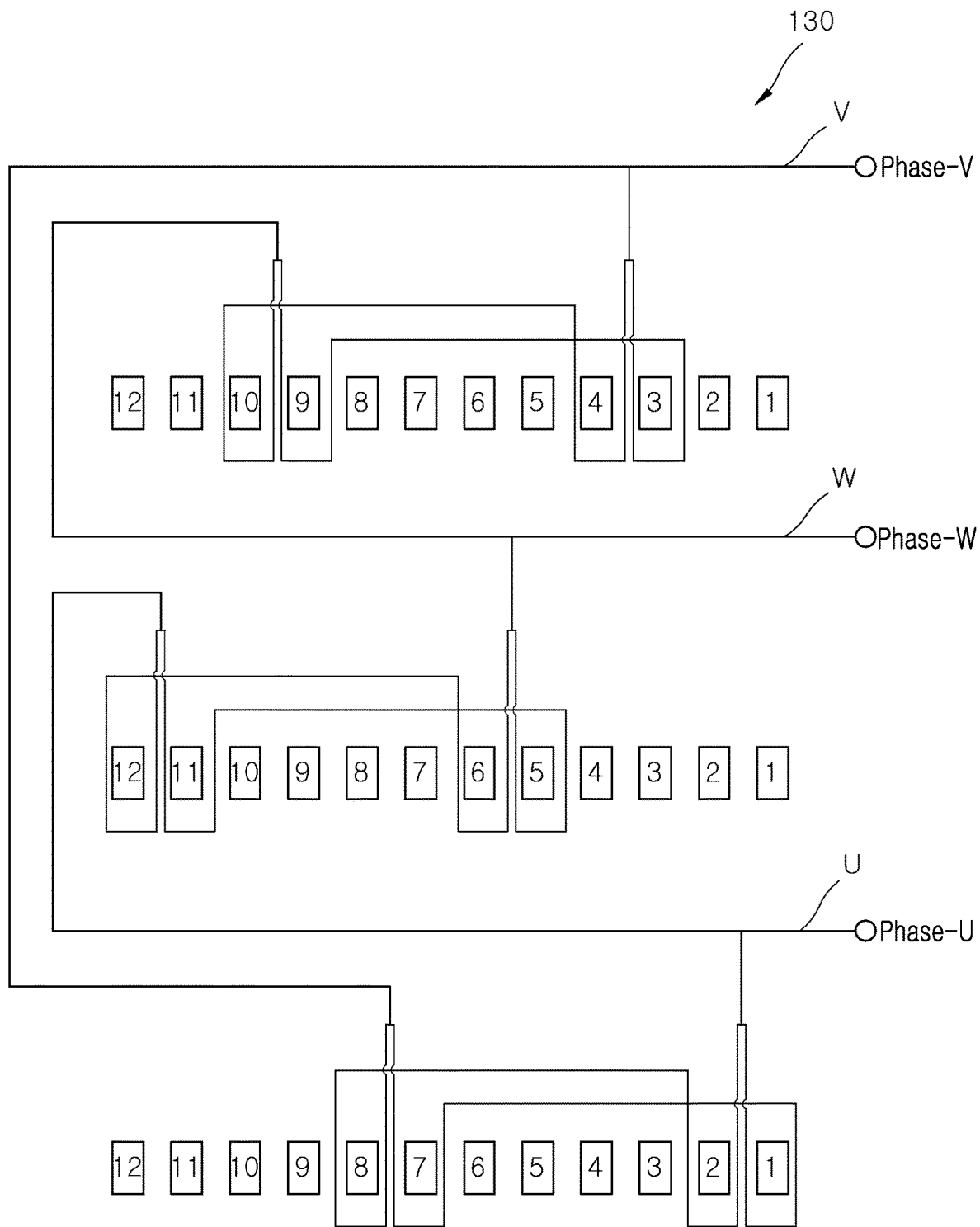
FIG. 2 is a configuration diagram schematically illustrating a winding state of a 3-phase coil part in the motor apparatus in accordance with the first exemplary embodiment of the disclosure.
Figures 3, 4:
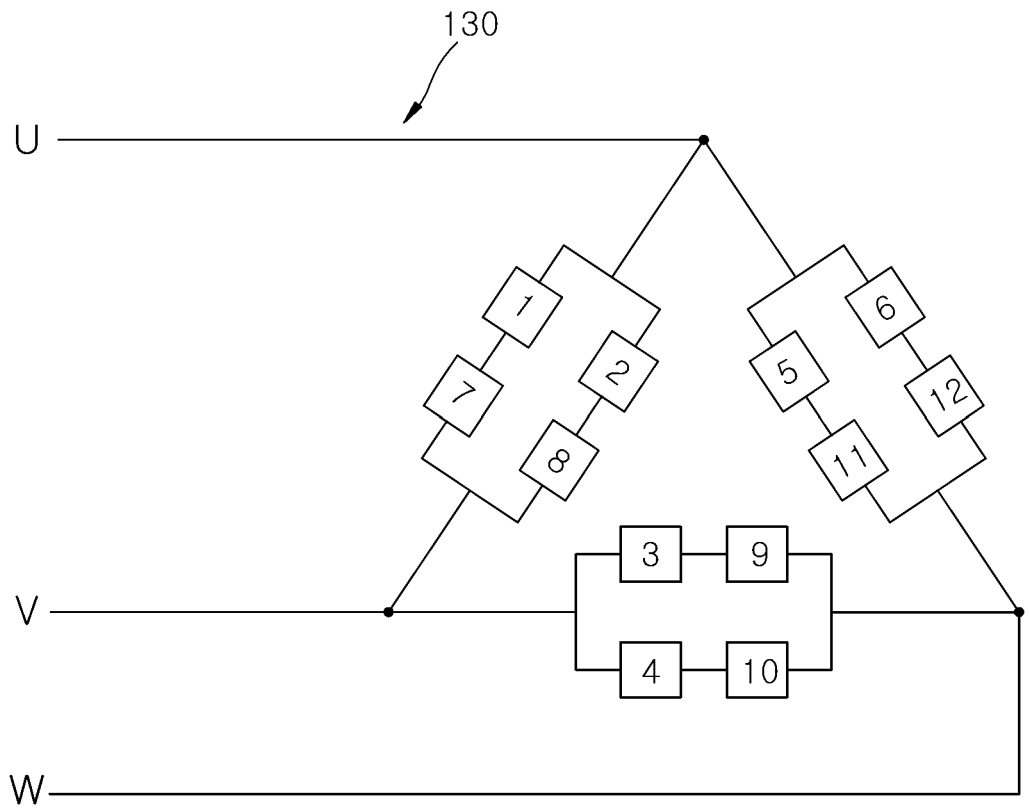
FIG. 3 is a configuration diagram schematically illustrating a connection state of the 3-phase coil part in the motor apparatus in accordance with the first exemplary embodiment of the disclosure.
FIG. 4 is a table schematically illustrating the connection state of the 3-phase coil part in the motor apparatus in accordance with the first exemplary embodiment of the disclosure.

FIG. 1 is a configuration diagram schematically illustrating a motor apparatus in accordance with a first exemplary embodiment of the disclosure, FIG. 2 is a configuration diagram schematically illustrating a winding state of a 3-phase coil part in the motor apparatus in accordance with the first exemplary embodiment of the disclosure, FIG. 3 is a configuration diagram schematically illustrating a connection state of the 3-phase coil part in the motor apparatus in accordance with the first exemplary embodiment of the disclosure, and FIG. 4 is a table schematically illustrating the connection state of the 3-phase coil part in the motor apparatus in accordance with the first exemplary embodiment of the disclosure.

Referring to FIGS. 1 to 4, the motor apparatus in accordance with the first exemplary embodiment of the disclosure includes a stator 110, a rotor 120 and a 3-phase coil part 130. The motor apparatus is an inner rotor-type motor apparatus, in which the rotor 120 is rotated in the stator 110.

The stator 110 has a plurality of coils 1 to 12 formed along the circumference thereof. The stator 110 has a motor casing installed on the outside thereof. The stator 110 has a shaft installed therein to transfer torque generated by the rotor 120 as a load.

The stator 110 may include a plurality of plate-shaped steel cores stacked therein. In this case, the plurality of steel cores stacked in the stator 110 may have the same thickness.

The stator 110 may have two or more kinds of steel cores stacked therein and having different thicknesses. The stator 110 may be properly designed according to the property of an axial electromagnetic force of the stator 110.

The stator 110 has a plurality of teeth T disposed at even intervals therein, and a slot S is formed between the respective teeth T. The slot S is a space where an electromotive force is generated when a current is applied to the 3-phase coil part 130. In FIG. 1, reference numerals marked on the teeth T represent coils 1 to 12 wound around the respective teeth T.

The rotor 120 is rotatably installed in the stator 110, and has a plurality of magnets 123 arranged along the circumference thereof. As the magnet 123, a magnetized permanent magnet is applied. The number of the magnets 123 disposed on the rotor 120 is different from the number of the slots or the coils 1 to 12. When the number of the slots S is divided by the number of the magnets 123, a fractional value is obtained instead of an integer value. Therefore, a preset phase difference between the slots S is changed according to the fractional value.

The magnets 123 may be permanent magnets attached on the surface of the core 121 in the rotor 120. Furthermore, the magnets 123 may be buried in the core 121 of the rotor 120. The magnets 123 may be installed in various shapes in the rotor 120.

The 3-phase coil part 130 includes the plurality of coils 1 to 12 wound around the respective teeth T, and the coils 1 to 12 having a preset phase difference are wound in parallel. Since the 3-phase coil part 130 is wound in the width direction of the teeth T, each of the coils 1 to 12 is divided into a half wound around one tooth T on one side thereof, and the other half wound around another tooth T on the other side thereof. Since the coils 1 to 12 having the preset phase difference are wound in parallel in the 3-phase coil part 130, the coil disposed on one side of each of the coils 1 to 12 is wound in the forward direction, and the coil disposed on the other side thereof is wound in the reverse direction. Since a parallel circuit is formed in the coils 1 to 12 having the preset phase difference, a circulating current flows in the opposite direction on both sides of the corresponding slot S.

Therefore, when the motor apparatus is counter-rotated by an external force, such as hydraulic pressure in case of a failure of an electrical system, counter electromotive forces induced by the coils 1 to 12 electrically have a constant phase difference. As the coils 1 to 12 having the constant phase difference are connected in parallel, a circulating current is generated in the coils 1 to 12 connected in parallel. Since such a circulating current generates torque in a direction opposite to a direction that the rotor 120 is rotated by the external force, the rotating speed of the rotor 120 may be reduced. Thus, in case of a failure of the electrical system, a nut may be reversed to counter-rotate the shaft. When the shaft counter-rotates the rotor 120, the terminal rotating speed of the rotor 120 may be reduced to prevent an impact applied to the nut and a ball screw. Furthermore, since the impact applied to the nut and the ball screw is prevented, impulsive noise of stoppers in the nut and the ball screw can be prevented. Furthermore, a part such as a tolerance ring, which is applied to the shaft in order to prevent mechanical damage to the shaft, may not be installed.

Since the rotor 120 can be prevented from being counter-rotated at high speed in the motor apparatus, it is possible to reduce a counter electromotive force, which is generated in the motor apparatus and transferred to 3-phase terminals. Therefore, an element of an ECU (Electronic Control Unit) can be prevented from being damaged by the counter electromotive force generated in the motor apparatus.

The 3-phase coil part 130 includes a U-phase coil U, a V-phase coil V, and a W-phase coil W. The U-phase coil U, the V-phase coil V, and the W-phase coil W are installed, so as to have a phase difference of 120° therebetween.

The U-phase coil U is configured by winding a plurality of coils 1, 2, 7 and 8 having a first phase difference in parallel, and winding the coils having the same phase difference, among the coils 1, 2, 7 and 8 wound in parallel, in series. The V-phase coil V is configured by winding a plurality of coils 3, 4, 9 and 10 having a second phase difference in parallel, and winding the coils having the same phase difference, among the coils 3, 4, 9 and 10 wound in parallel, in series. The W-phase coil W is configured by winding a plurality of coils 5, 6, 11 and 12 having a third phase difference in parallel, and winding the coils having the same phase difference, among the coils 5, 6, 11 and 12 wound in parallel, in series.

In other words, the U-phase coil U is configured by winding a plurality of coil sets 1, 2, 7 and 8 having the first phase difference in parallel, and winding the coils having the same phase difference, among the coil sets 1, 2, 7 and 8 wound in parallel, in series. Furthermore, the V-phase coil V is configured by winding a plurality of coil sets 3, 4, 8 and 9 having the second phase difference in parallel, and winding the coils having the same phase difference, among the coil sets 3, 4, 8 and 9 wound in parallel, in series. Furthermore, the W-phase coil W is configured by winding a plurality of coil sets 5, 6, 11 and 12 having the third phase difference in parallel, and winding the coils having the same phase difference, among the coil sets 5, 6, 11 and 12 wound in parallel, in series.

When the U-phase coil U, the V-phase coil V and the W-phase coil W are wound around the coils 1 to 12 having the preset phase difference in parallel, respectively, a circulating current is generated in the coils 1 to 12 having the preset phase difference. Since such a circulating current generates torque in a direction opposite to a direction that the rotor is rotated by an external force, the rotating speed of the rotor may be reduced.

Therefore, when the nut is reversed to counter-rotate the rotor 120 in case of a failure of the electrical system, the terminal rotating speed of the rotor 120 may be reduced to prevent an impact applied to the nut and the ball screw. Furthermore, since the impact applied to the nut and the ball screw is prevented, impulsive noise of the stoppers in the nut and the ball screw can be prevented.

Since the rotor 120 can be prevented from being counter-rotated at high speed, it is possible to reduce a counter electromotive force, which is generated in the motor apparatus and transferred to the 3-phase terminals. Therefore, an element of the ECU can be prevented from being damaged by the counter electromotive force generated in the motor apparatus.

The U-phase coil U is configured by winding the plurality of coils 1, 2, 7 and 8 having the first phase difference of 20° to 30° in parallel, and winding the coils which mechanically have an angle difference of 180° therebetween and are electrically in-phase, among the coils 1, 2, 7 and 8 wound in parallel, in series. The V-phase coil V is configured by winding the plurality of coils 3, 4, 9 and 10 having the second phase difference of 20° to 30° in parallel, and winding the coils which mechanically have an angle difference of 180° therebetween and are electrically in-phase, among the coils 3, 4, 9 and 10 wound in parallel, in series. The W-phase coil W is configured by winding the plurality of coils 5, 6, 11 and 12 having the third phase difference of 20° to 30° in parallel, and winding the coils which mechanically have an angle difference of 180° therebetween and are electrically in-phase, among the coils 5, 6, 11 and 12 wound in parallel, in series.

Hereinafter, the winding method of the 3-phase coil part 130 will be described.

Referring to FIGS. 3 and 4, in the first exemplary embodiment of the motor apparatus, the rotor 120 includes the 10-pole magnets 123, and the stator 110 includes the 12 coils 1 to 12.

In this case the U-phase coil U is configured by winding the first and seventh coils 1 and 7 in series and winding the second and eighth coils 2 and 8 in series, and winding the first-seventh coil set 1-7 and the second-eight coil set 2-8 in parallel. The V-phase coil V is configured by winding the third and ninth coils 3 and 9 in series and winding the fourth and tenth coils 4 and 10 in series, and winding the third-ninth coil set 3-9 and the fourth-tenth coil set 4-10 in parallel. The W-phase coil W is configured by winding the fifth and eleventh coils 5 and 11 in series and winding the sixth and 12th coils 6 and 12 in series, and winding the fifth-eleventh coil set 5-11 and the sixth-12th coil set 6-12 in parallel. The coil set indicates two or more coils, which are connected in series by the corresponding coil U, V or W.

Since the U-phase coil U is configured by winding the first-seventh coil set 1-7 and the second-eighth coil set 2-8 in parallel, counter electromotive forces generated by the first and second coils 1 and 2 in the U-phase coil U have a phase difference of 30°, and counter electromotive forces generated by the seventh and eighth coils 7 and 8 also have a phase difference of 30°. Therefore, the U-phase coil U forms a closed loop, in which a circulating current flows along the first, seventh, eighth and second coils 1, 7, 8 and 2, or a circulating current flows along the second, eighth, seventh and first coils 2, 8, 7 and 1. In this case, since the first-seventh coil set 1-7 and the second-eighth coil set 2-8, which are wound in parallel, generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the third-ninth coil set 3-9 and the fourth-tenth coil set 4-10 in parallel, counter electromotive forces generated by the third and fourth coils 3 and 4 in the V-phase coil V have a phase difference of 30°, and counter electromotive forces generated by the ninth and tenth coils 9 and 10 also have a phase difference of 30°. Therefore, the V-phase coil V forms a closed loop, in which a circulating current flows along the third, ninth, tenth and fourth coils 3, 9, 10 and 4, or a circulating current flows along the fourth, tenth, ninth and third coils 4, 10, 9 and 3. In this case, since the third-ninth coil set 3-9 and the fourth-tenth coil set 4-10, which are wound in parallel, generate torques in the opposite direction, the counter rotating speed of the rotor 120 can be reduced even though the rotor 120 is counter-rotated by an external force. Therefore, it is possible to prevent the ECU from being damaged by the counter electromotive force, which is generated in the motor apparatus and transferred to the 3-phase terminals.

Since the W-phase coil W is configured by winding the fifth-11th coil set 5-11 and the sixth-12th coil set 6-12 in parallel, counter electromotive forces generated by the fifth and sixth coils 5 and 6 in the W-phase coil W have a phase difference of 30°, and counter electromotive forces generated by the 11th and 12th coils 11 and 12 also have a phase difference of 30°. Therefore, the W-phase coil W forms a closed loop, in which a circulating current flows along the fifth, 11th, 12th and sixth coils 5, 11, 12 and 6, or a circulating current flows along the sixth, 12th, 11th and fifth coils 6, 12, 11 and 5. In this case, since the fifth-11th coil set 5-11 and the sixth-12th coil set 6-12, which are wound in parallel, generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Next, a motor apparatus in accordance with a second exemplary embodiment of the disclosure will be described.

Figure 5:
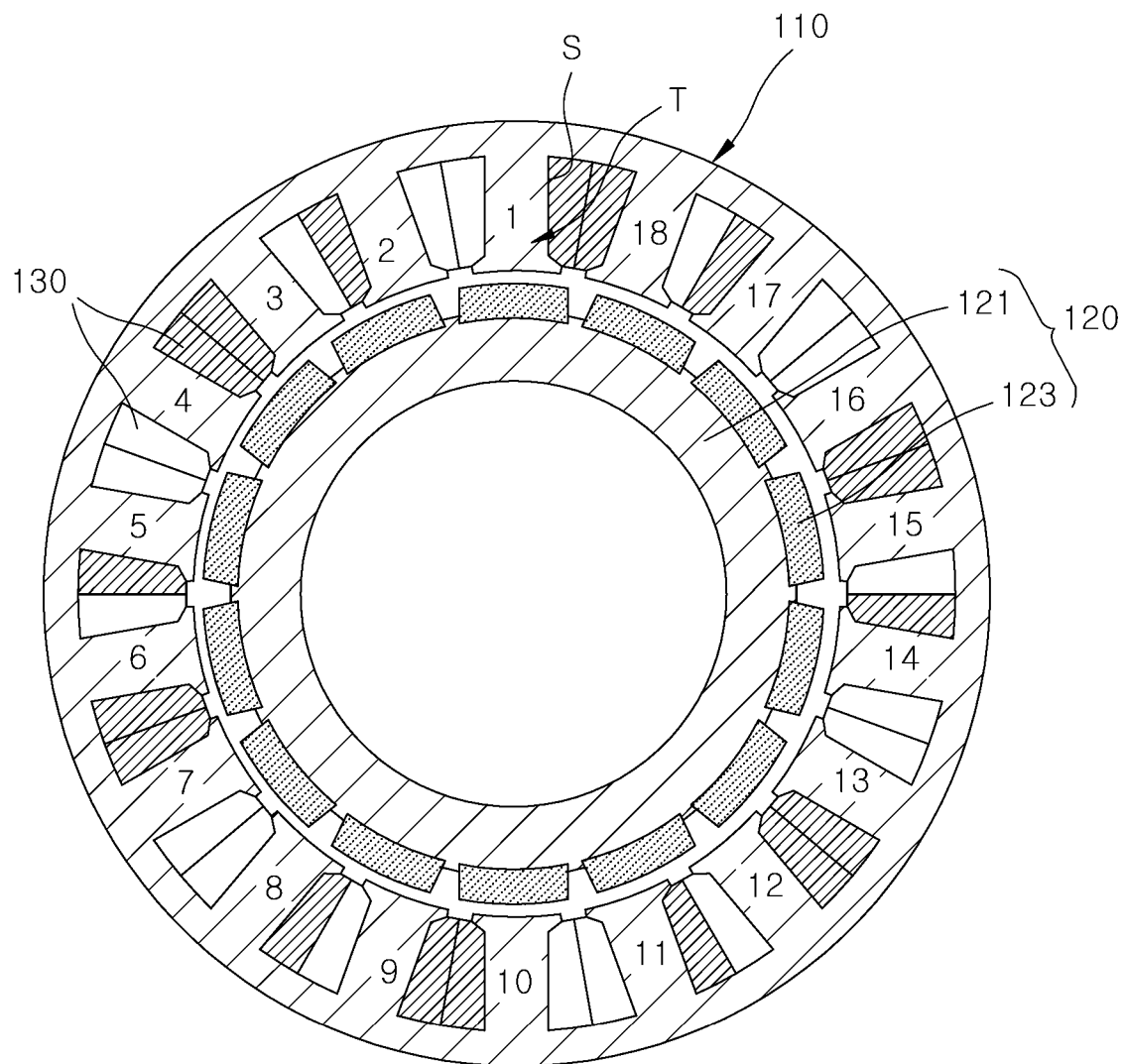
FIG. 5 is a configuration diagram schematically illustrating a motor apparatus in accordance with a second exemplary embodiment of the disclosure.
Figures 6, 7:
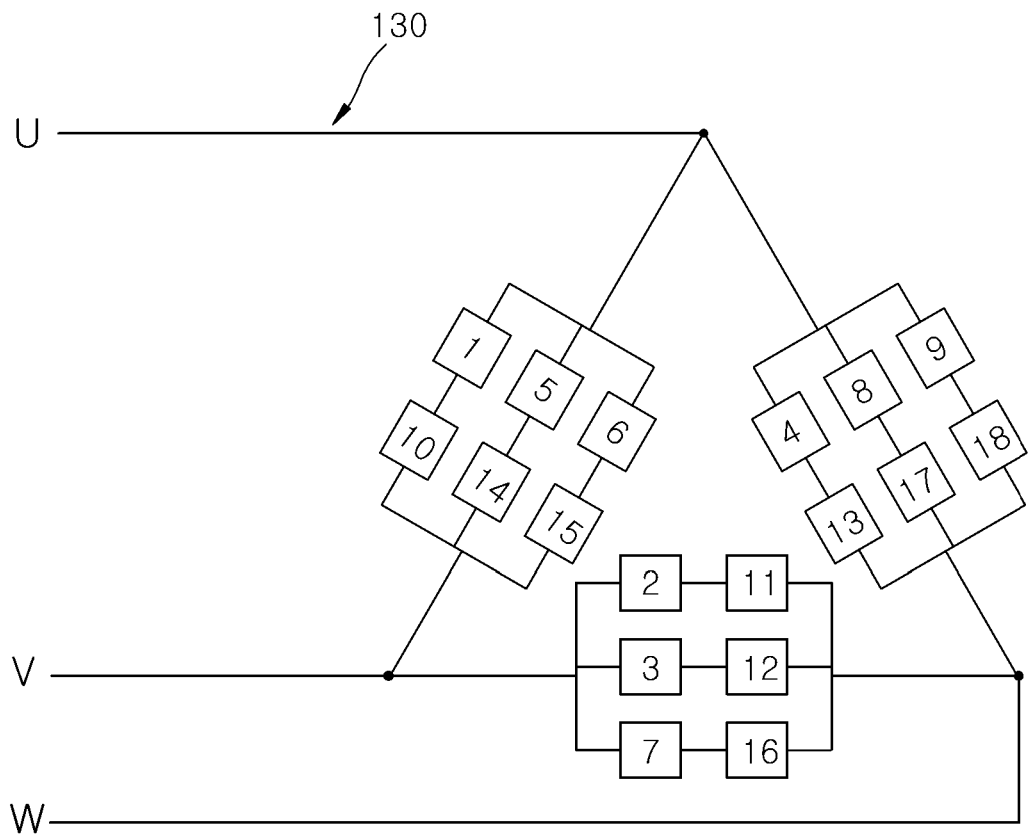
FIG. 6 is a configuration diagram schematically illustrating a connection state of a 3-phase coil part in the motor apparatus in accordance with the second exemplary embodiment of the disclosure.
FIG. 7 is a table schematically illustrating the connection state of the 3-phase coil part in the motor apparatus in accordance with the second exemplary embodiment of the disclosure.

FIG. 5 is a configuration diagram schematically illustrating a motor apparatus in accordance with a second exemplary embodiment of the disclosure, FIG. 6 is a configuration diagram schematically illustrating a connection state of a 3-phase coil part in the motor apparatus in accordance with the second exemplary embodiment of the disclosure, and FIG. 7 is a table schematically illustrating the connection state of the 3-phase coil part in the motor apparatus in accordance with the second exemplary embodiment of the disclosure.

Referring to FIGS. 5 to 7, the motor apparatus in accordance with the second exemplary embodiment of the disclosure includes a rotor 120 and a stator 110. The rotor 120 includes 14-pole magnets 123, and the stator 110 includes 18 coils 1 to 18.

In this case, a U-phase coil U is configured by winding first and tenth coils 1 and 10 in series, winding fifth and 14th coils 5 and 14 in series and winding the sixth and 15th coils 6 and 15 in series, and winding a first-tenth coil set 1-10, a fifth-14th coil set 5-14 and a sixth-15th coil set 6-15 in parallel. A V-phase coil V is configured by winding second and 11th coils 2 and 11 in series, winding third and 12th coils 3 and 12 in series and winding seventh and 16th coils 7 and 16 in series, and winding a second-11th coil set 2-11, a third-12th coil set 3-12 and a seventh-16th coil set 7-16 in parallel. A W-phase coil W is configured by winding fourth and 13th coils 4 and 13 in series, winding eighth and 17th coils 8 and 17 in series and winding ninth and 18th coils 9 and 18 in series, and winding a fourth-13th coil set 4-13, an eighth-17th coil set 8-17 and a ninth-18th coil set 9-18 in parallel.

Since the U-phase coil U is configured by winding the first-tenth coil set 1-10, the fifth-14th coil set 5-14 and the sixth-15th coil set 6-15 in parallel, counter electromotive forces generated by the fifth and sixth coils 5 and 6 in the U-phase coil U have a phase difference of 30°, and counter electromotive forces generated by the 14th and 15th coils 14 and 15 also have a phase difference of 30°. Therefore, the U-phase coil U forms a closed loop, in which a circulating current flows along the fifth, 14th, 15th and sixth coils 5, 14, 15 and 6, or a circulating current flows in the opposite way. In this case, since the first-tenth coil set 1-10, the fifth-14th coil set 5-14 and the sixth-15th coil set 6-15, which are wound in parallel, generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force, which is generated in the motor apparatus and transferred to the 3-phase terminals.

Since the V-phase coil V is configured by winding the second-11th coil set 2-11, the third-12th coil set 3-12 and the seventh-16th coil set 7-16 in parallel, counter electromotive forces generated by the second and third coils 2 and 3 in the V-phase coil V have a phase difference of 30°, and counter electromotive forces generated by the 11th and 12th coils 11 and 12 also have a phase difference of 30°. Therefore, the V-phase coil V forms a closed loop, in which a circulating current flows along the second, 11th, 12th and third coils 2, 11, 12 and 3, or a circulating current flows in the opposite way. In this case, since the second-11th coil set 2-1, the third-12th coil set 3-12 and the seventh-16th coil set 7-16, which are wound in parallel, generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Since the W-phase coil W is configured by winding the fourth-13th coil set 4-13, the eighth-17th coil set 8-17 and the ninth-18th coil set 9-18 in parallel, counter electromotive forces generated by the eighth and ninth coils 8 and 9 in the W-phase coil W have a phase difference of 30°, and counter electromotive forces generated by the 17th and 18th coils 17 and 18 also have a phase difference of 30°. Therefore, the W-phase coil W forms a closed loop, in which a circulating current flows along the eighth, 17th, 18th and ninth coils 8, 17, 18 and 9, or a circulating current flows in the opposite way. In this case, since the fourth-13th coil set 4-13, the eighth-17th coil set 8-17 and the ninth-18th coil set 9-18, which are wound in parallel, generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Next, a motor apparatus in accordance with a third exemplary embodiment of the disclosure will be described.

Figure 8:
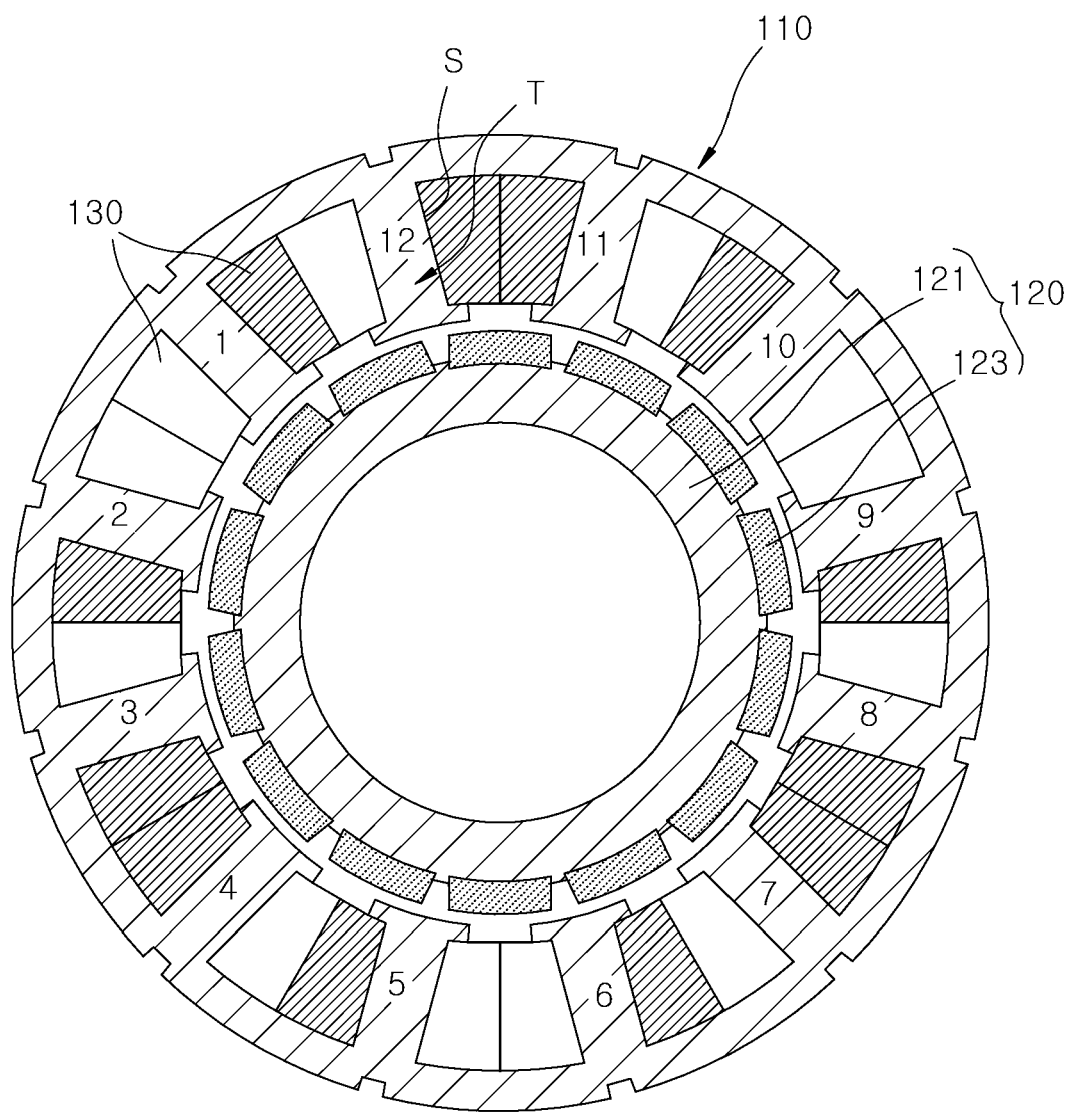
FIG. 8 is a configuration diagram schematically illustrating a motor apparatus in accordance with a third exemplary embodiment of the disclosure.
Figures 9, 10:
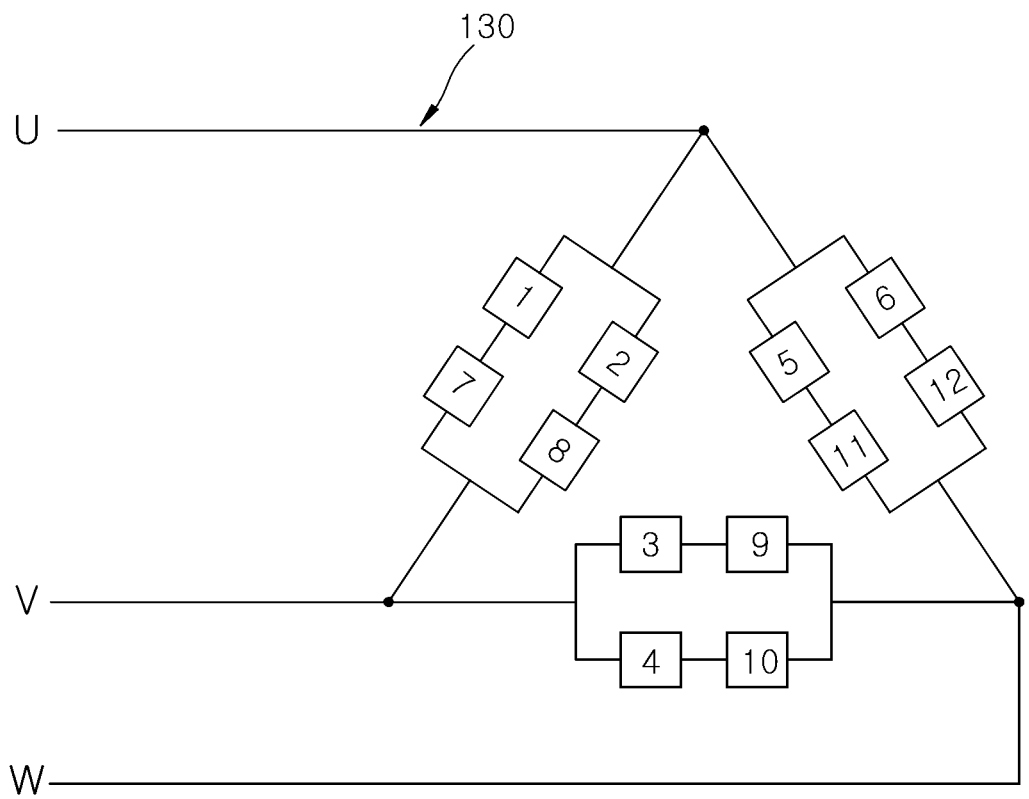
FIG. 9 is a configuration diagram schematically illustrating a connection state of a 3-phase coil part in the motor apparatus in accordance with the third exemplary embodiment of the disclosure.
FIG. 10 is a table schematically illustrating the connection state of the 3-phase coil part in the motor apparatus in accordance with the third exemplary embodiment of the disclosure.

FIG. 8 is a configuration diagram schematically illustrating a motor apparatus in accordance with a third exemplary embodiment of the disclosure, FIG. 9 is a configuration diagram schematically illustrating a connection state of a 3-phase coil part in the motor apparatus in accordance with the third exemplary embodiment of the disclosure, and FIG. 10 is a table schematically illustrating the connection state of the 3-phase coil part in the motor apparatus in accordance with the third exemplary embodiment of the disclosure.

Referring to FIGS. 8 to 10, the motor apparatus in accordance with the third exemplary embodiment of the disclosure includes a rotor 120 and a stator 110. The rotor 120 includes 14-pole magnets 123, and the stator 110 includes 12 coils 1 to 12.

A U-phase coil U is configured by winding first and seventh coils 1 and 7 in series and winding second and eighth coils 2 and 8 in series, and winding a first-seventh coil set 1-7 and a second-eight coil set 2-8 in parallel. A V-phase coil V is configured by winding third and ninth coils 3 and 9 in series and winding fourth and tenth coils 4 and 10 in series, and winding a third-ninth coil set 3-9 and a fourth-tenth coil set 4-10 in parallel. A W-phase coil W is configured by winding fifth and 11th coils 5 and 11 in series and winding sixth and 12th coils 6 and 12 in series, and winding a fifth-11th coil set 5-11 and a sixth-12th coil set 6-12 in parallel.

Since the U-phase coil U is configured by winding the first-seventh coil set 1-7 and the second-eighth coil set 2-8 in parallel, counter electromotive forces generated by the first and second coils 1 and 2 in the U-phase coil U have a phase difference of 30°, and counter electromotive forces generated by the seventh and eighth coils 7 and 8 also have a phase difference of 30°. Therefore, the U-phase coil U forms a closed loop, in which a circulating current flows along the first, seventh, eighth and second coils 1, 7, 8 and 2, or a circulating current flows in the opposite way. In this case, since the first-seventh coil set 1-7 and the second-eighth coil set 2-8 which are wound in parallel generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the third-ninth coil set 3-9 and the fourth-tenth coil set 4-10 in parallel, counter electromotive forces generated by the third and fourth coils 3 and 4 in the V-phase coil V have a phase difference of 30°, and counter electromotive forces generated by the ninth and tenth coils 9 and 10 also have a phase difference of 30°. Therefore, the V-phase coil V forms a closed loop, in which a circulating current flows along the third, ninth, tenth and fourth coils 3, 9, 10 and 4, or a circulating current flows in the opposite way. In this case, since the third-ninth coil set 3-9 and the fourth-tenth coil set 4-10 which are wound in parallel generate torques in the opposite way, the counter rotating speed of the rotor 120 can be reduced even though the rotor 120 is counter-rotated by an external force. Furthermore, it is possible to prevent the ECU from being damaged by the counter electromotive force which is generated in the motor apparatus and transferred to the 3-phase terminals.

Since the W-phase coil W is configured by winding the fifth-11th coil set 5-11 and the sixth-12th coil set 6-12 in parallel, counter electromotive forces generated by the fifth and sixth coils 5 and 6 in the W-phase coil W have a phase difference of 30°, and counter electromotive forces generated by the 11th and 12th coils 11 and 12 also have a phase difference of 30°. Therefore, the W-phase coil W forms a closed loop, in which a circulating current flows along the fifth, 11th, 12th and sixth coils 5, 11, 12 and 6, or a circulating current flows along the sixth, 12th, 11th and fifth coils 6, 12, 11 and 5. In this case, since the fifth-11th coil set 5-11 and the sixth-12th coil set 6-12 which are wound in parallel generate torques in the opposite direction, the counter rotating speed of the rotor 120 can be reduced even though the rotor 120 is counter-rotated by an external force. Furthermore, it is possible to prevent the ECU from being damaged by the counter electromotive force which is generated in the motor apparatus and transferred to the 3-phase terminals.

Next, a motor apparatus in accordance with a fourth exemplary embodiment of the disclosure will be described.

Figure 11:
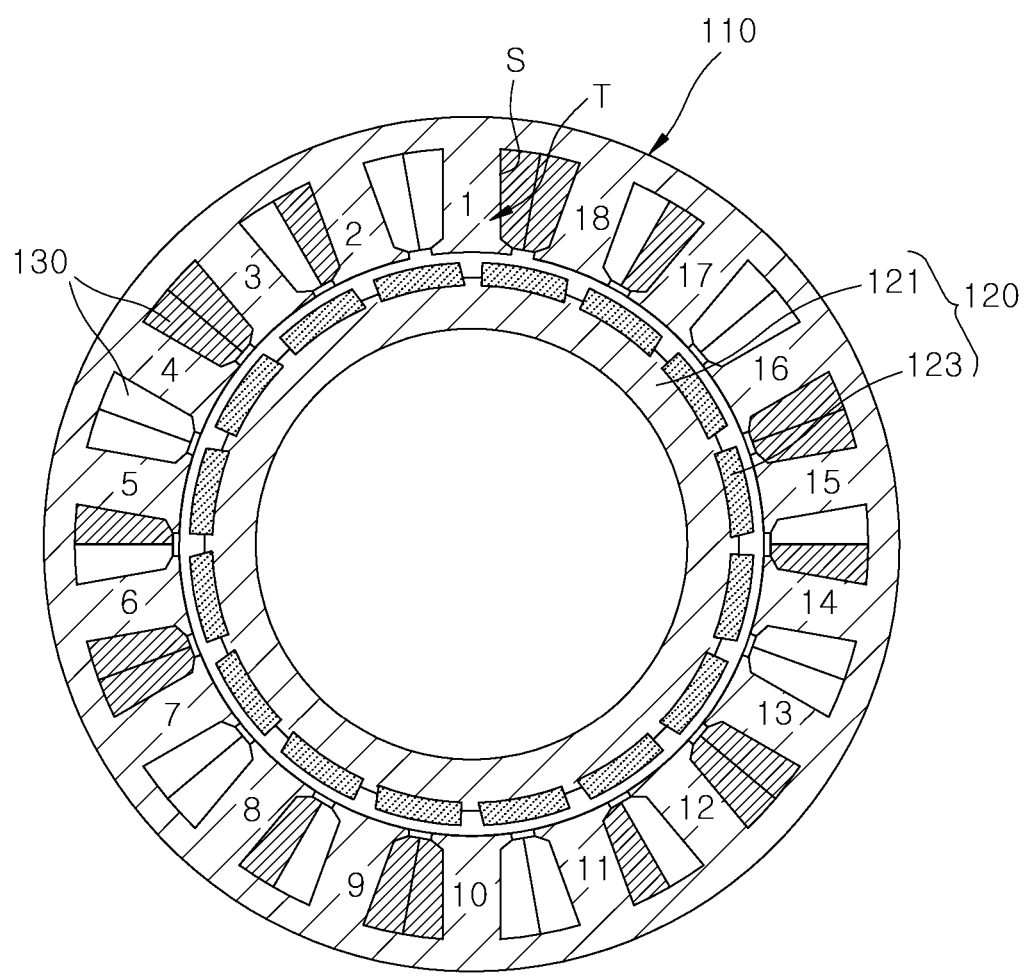
FIG. 11 is a configuration diagram schematically illustrating a motor apparatus in accordance with a fourth exemplary embodiment of the disclosure.
Figures 12, 13:
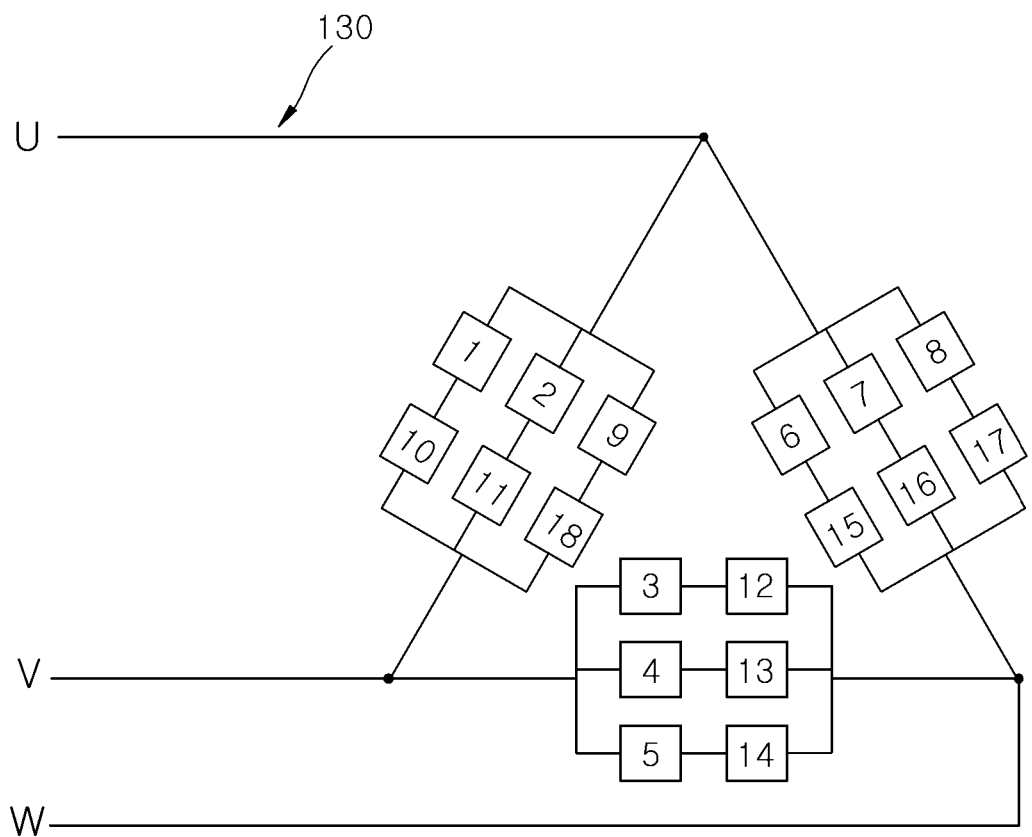
FIG. 12 is a configuration diagram schematically illustrating a connection state of a 3-phase coil part in the motor apparatus in accordance with the fourth exemplary embodiment of the disclosure.
FIG. 13 is a table schematically illustrating the connection state of the 3-phase coil part in the motor apparatus in accordance with the fourth exemplary embodiment of the disclosure.

FIG. 11 is a configuration diagram schematically illustrating a motor apparatus in accordance with a fourth exemplary embodiment of the disclosure, FIG. 12 is a configuration diagram schematically illustrating a connection state of a 3-phase coil part in the motor apparatus in accordance with the fourth exemplary embodiment of the disclosure, and FIG. 13 is a table schematically illustrating the connection state of the 3-phase coil part in the motor apparatus in accordance with the fourth exemplary embodiment of the disclosure.

Referring to FIGS. 11 to 13, the motor apparatus in accordance with the fourth exemplary embodiment of the disclosure includes a rotor 120 and a stator 110. The rotor 120 includes 16-pole magnets 123, and the stator 110 includes 18 coils 1 to 18.

A U-phase coil U is configured by winding first and tenth coils 1 and 10 in series, winding second and 11th coils 2 and 11 in series and winding ninth and 18th coils 9 and 18 in series, and winding a first-tenth coil set 1-10, a second-11th coil set 2-11 and a ninth-18th coil set 9-18 in parallel. A V-phase coil V is configured by winding third and 12th coils 3 and 12 in series, winding fourth and 13th coils 4 and 13 in series and winding fifth and 14th coils 5 and 14 in series, and winding a third-12th coil set 3-12, a fourth-13th coil set 4-13 and a fifth-14th coil set 5-14 in parallel. A W-phase coil W is configured by winding sixth and 15th coils 6 and 15 in series, winding seventh and 16th coils 7 and 16 in series and winding eighth and 17th coils 8 and 17 in series, and winding a sixth-15th coil set 6-15, a seventh-16th coil set 7-16 and an eighth-17th coil set 8-17 in parallel.

Since the U-phase coil U is configured by winding the first-tenth coil set 1-10, the second-11th coil set 2-11 and the ninth-18th coil set 9-18 in parallel, counter electromotive forces generated by the first and second coils 1 and 2 in the U-phase coil U have a phase difference of 30°, and counter electromotive forces generated by the tenth and 11th coils 10 and 11 also have a phase difference of 30°. Therefore, the U-phase coil U forms a closed loop, in which a circulating current flows along the first, tenth, 11th and second coils 1, 10, 11 and 2, or a circulating current flows in the opposite way. In this case, since the first-tenth coil set 1-10, the second-11th coil set 2-11 and the ninth-18th coil set 9-18 which are wound in parallel generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, the ECU can be prevented from being damaged by the counter electromotive force generated in the motor apparatus.

Since the V-phase coil V is configured by winding the third-12th coil set 3-12, the fourth-13th coil set 4-13 and the fifth-14th coil set 5-14 in parallel, counter electromotive forces generated by the third and fourth coils 3 and 4 in the V-phase coil V have a phase difference of 30°, and counter electromotive forces generated by the 12th and 13th coils 12 and 13 also have a phase difference of 30°. Therefore, the V-phase coil V forms a closed loop, in which a circulating current flows along the third, 12th, 13th and fourth coils 3, 12, 13 and 4, or a circulating current flows in the opposite way. In this case, since the third-12th coil set 3-12, the fourth-13th coil set 4-13 and the fifth-14th coil set 5-14 which are wound in parallel generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Since the W-phase coil W is configured by winding the sixth-15th coil set 6-15, the seventh-16th coil set 7-16 and the eighth-17th coil set 8-17 in parallel, counter electromotive forces generated by the sixth and seventh coils 6 and 7 in the W-phase coil W have a phase difference of 30°, and counter electromotive forces generated by the 15th and 16th coils 15 and 16 also have a phase difference of 30°. Therefore, the W-phase coil W forms a closed loop, in which a circulating current flows along the sixth, 15th, 16th and seventh coils 6, 15, 16 and 7, or a circulating current flows in the opposite way. In this case, since the sixth-15th coil set 6-15, the seventh-16th coil set 7-16 and the eighth-17th coil set 8-17 which are wound in parallel generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Next, a motor apparatus in accordance with a fifth exemplary embodiment of the disclosure will be described.

Figure 14:
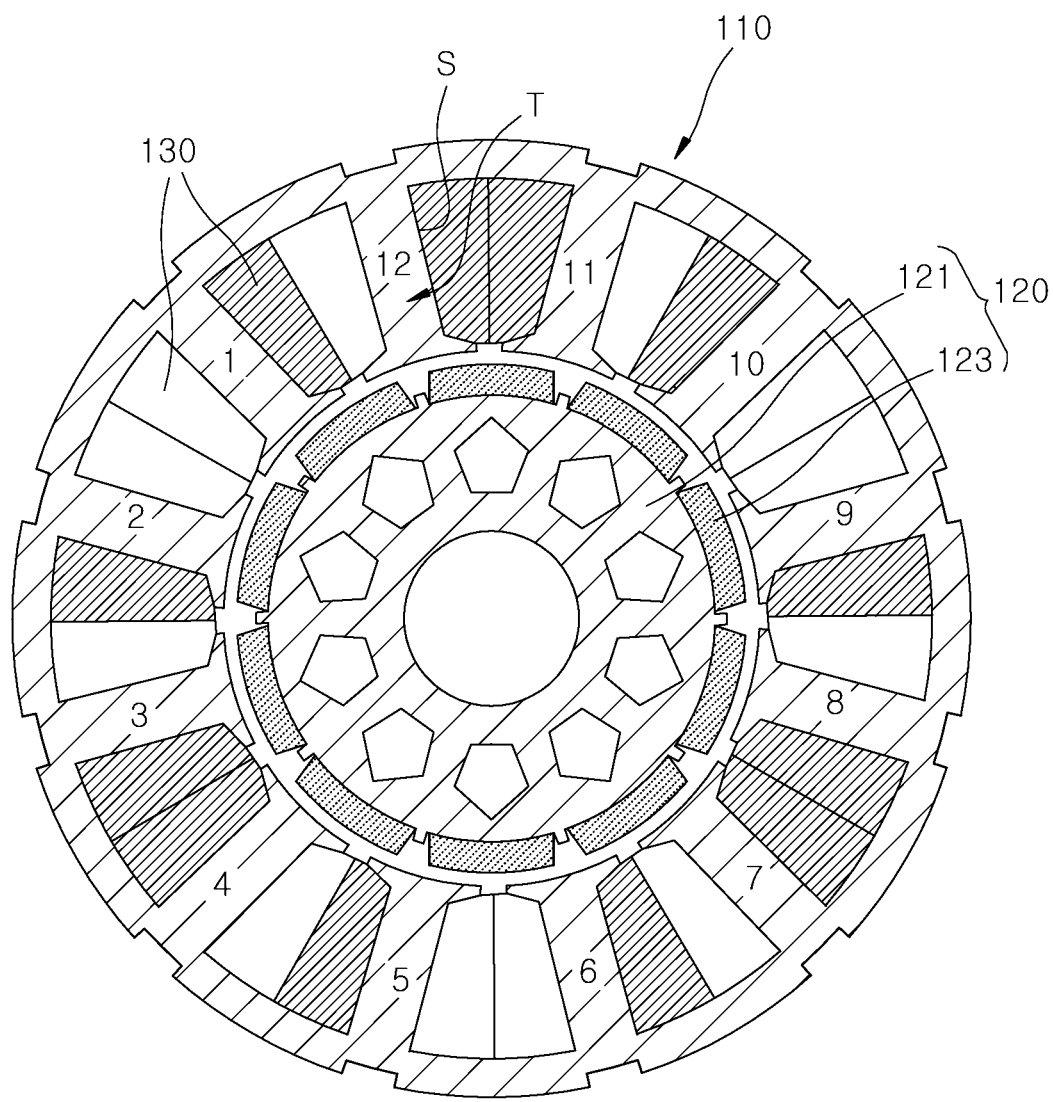
FIG. 14 is a configuration diagram schematically illustrating a motor apparatus in accordance with a fifth exemplary embodiment of the disclosure.
Figure 15:
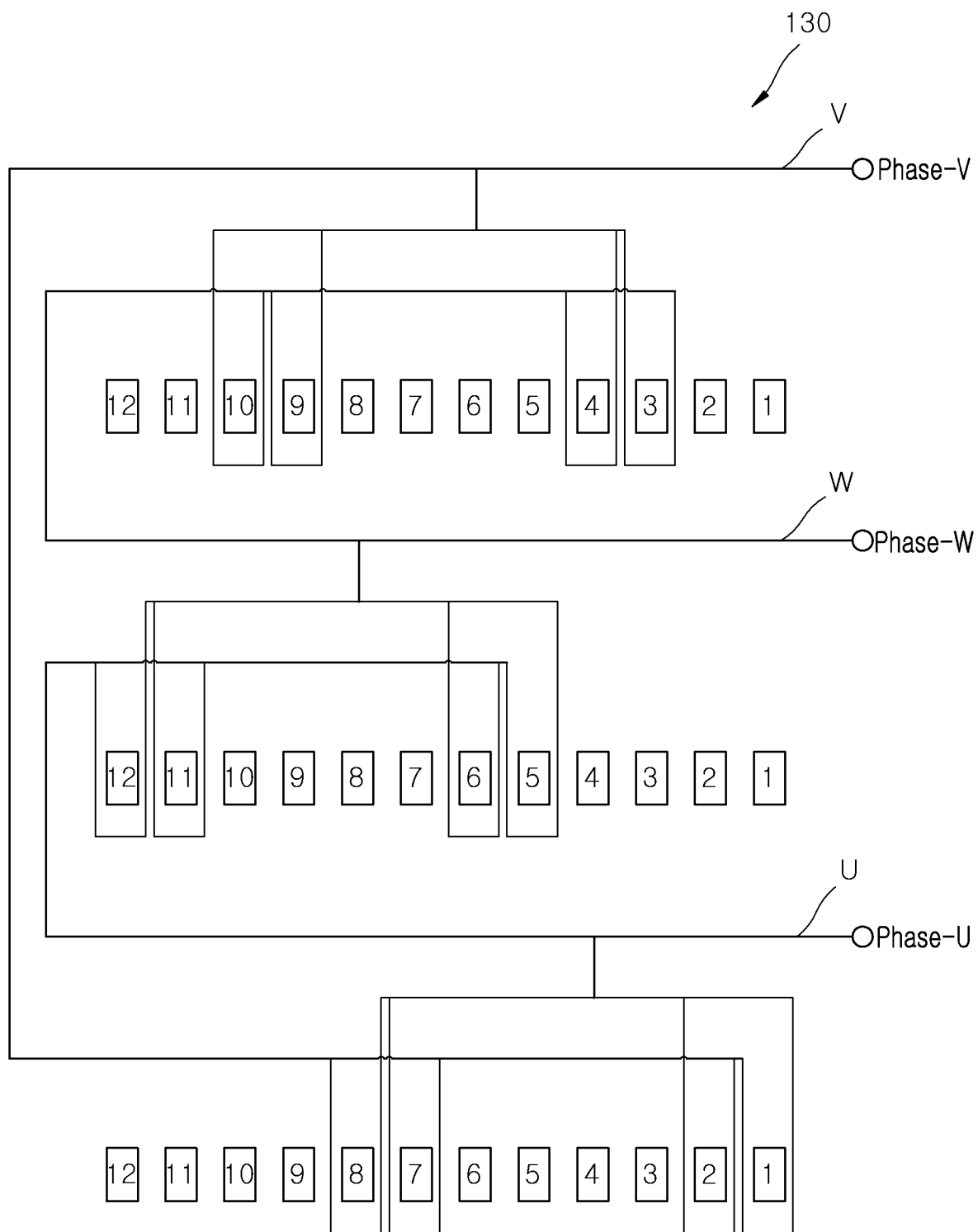
FIG. 15 is a configuration diagram schematically illustrating a winding state of a 3-phase coil part in the motor apparatus in accordance with the fifth exemplary embodiment of the disclosure.
Figures 16, 17:
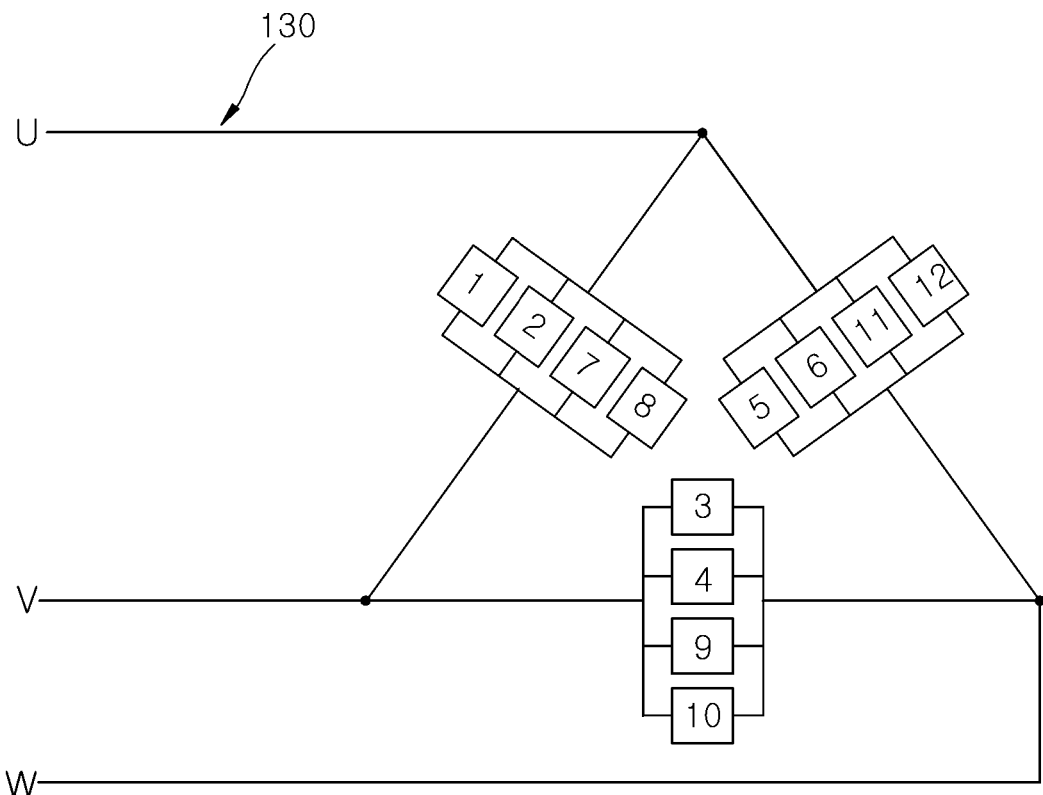
FIG. 16 is a configuration diagram schematically illustrating a connection state of the 3-phase coil part in the motor apparatus in accordance with the fifth exemplary embodiment of the disclosure.
FIG. 17 is a table schematically illustrating the connection state of the 3-phase coil part in the motor apparatus in accordance with the fifth exemplary embodiment of the disclosure.

FIG. 14 is a configuration diagram schematically illustrating a motor apparatus in accordance with a fifth exemplary embodiment of the disclosure, FIG. 15 is a configuration diagram schematically illustrating a winding state of a 3-phase coil part in the motor apparatus in accordance with the fifth exemplary embodiment of the disclosure, FIG. 16 is a configuration diagram schematically illustrating a connection state of the 3-phase coil part in the motor apparatus in accordance with the fifth exemplary embodiment of the disclosure, and FIG. 17 is a table schematically illustrating the connection state of the 3-phase coil part in the motor apparatus in accordance with the fifth exemplary embodiment of the disclosure.

Referring to FIGS. 14 to 17, the 3-phase coil part 130 in the motor apparatus in accordance with the fifth exemplary embodiment of the disclosure includes a U-phase coil U, a V-phase coil V and a W-phase coil W. The U-phase coil U, the V-phase coil V and the W-phase coil W are installed with a phase difference of 120° therebetween.

The U-phase coil U is configured by winding a plurality of coils 1, 2, 7 and 8 having a first phase difference in parallel, and winding the coils having the same phase difference, among the coils 1, 2, 7 and 8 wound in parallel, in parallel. The V-phase coil V is configured by winding a plurality of coils 3, 4, 9 and 10 having a second phase difference in parallel, and winding the coils having the same phase difference, among the coils 3, 4, 9 and 10 wound in parallel, in parallel. The W-phase coil W is configured by winding a plurality of coils 5, 6, 11 and 12 having a third phase difference in parallel, and winding the coils having the same phase difference, among the coils 5, 6, 11 and 12 wound in parallel, in parallel.

In other words, the U-phase coil U is configured by winding a plurality of coil sets 1, 2, 7 and 8 having the first phase difference in parallel, and winding the coils having the same phase difference, among the coil sets 1, 2, 7 and 8 wound in parallel, in parallel. The V-phase coil V is configured by winding a plurality of coil sets 3, 4, 9 and 10 having the second phase difference in parallel, and winding the coils having the same phase difference, among the coil sets 3, 4, 9 and 10 wound in parallel, in parallel. The W-phase coil W is configured by winding a plurality of coil sets 5, 6, 11 and 12 having the third phase difference in parallel, and winding the coils having the same phase difference, among the coil sets 5, 6, 11 and 12 wound in parallel, in parallel.

Therefore, when counter electromotive forces are generated in the preset coils 1 to 18 in case of a fail of the electrical system, torque is generated in the reverse direction in the motor apparatus. Thus, the counter-rotating speed of the rotor 120 is reduced. In case of a fail of the electrical system, the nut may be reversed to count-rotate the ball screw, and the ball screw may counter-rotate the rotor 120 to reduce the terminal rotating speed of the rotor 120, thereby preventing an impact applied to the nut and the ball screw. Furthermore, since the impact applied to the nut and the ball screw is prevented, impulsive noise of the stoppers in the nut and the ball screw can be prevented.

Since the motor apparatus can be prevented from being counter-rotated at high speed, it is possible to reduce a counter electromotive force which is generated in the motor apparatus and transferred to the 3-phase terminals. Therefore, an element of the ECU can be prevented from being damaged by the counter electromotive force generated in the motor apparatus.

The U-phase coil U is configured by winding the plurality of coils 1, 2, 7 and 8 having the first phase difference of 20 to 30° in parallel, and winding the coils which mechanically have an angle difference of 180° therebetween and are electrically in-phase, among the coils 1, 2, 7 and 8 wound in parallel, in parallel. The V-phase coil V is configured by winding the plurality of coils 3, 4, 9 and 10 having the second phase difference of 20 to 30° in parallel, and winding the coils which mechanically have an angle difference of 180° therebetween and are electrically in-phase, among the coils 3, 4, 9 and 10 wound in parallel, in parallel. The W-phase coil W is configured by winding the plurality of coils 5, 6, 11 and 12 having the third phase difference of 20 to 30° in parallel, and winding the coils which mechanically have an angle difference of 180° therebetween and are electrically in-phase, among the coils 5, 6, 11 and 12 wound in parallel, in parallel.

Hereafter, the winding method of the 3-phase coil part 130 will be described as follows.

The rotor 120 includes the 10-pole magnets 123, and the stator 110 includes the 12 coils 1 to 12.

In this case, the U-phase coil U is configured by winding the first coil 1, the second coil 2, the seventh coil 7 and the eighth coil 8 in parallel. The V-phase coil V is configured by winding the third coil 3, the fourth coil 4, the ninth coil 9 and the tenth coil 10 in parallel. The W-phase coil W is configured by winding the fifth coil 5, the sixth coil 6, the 11th coil 11 and the 12th coil 12 in parallel.

Among the coils constituting the U-phase coil, the first coil 1 and the seventh coil 7 have the same phase difference of 180°, and the second coil 2 and the eighth coil 8 also have the same phase difference of 180°. Furthermore, among the coils constituting the V-phase coil, the third coil 3 and the ninth coil 9 have the same phase difference of 180°, and the fourth coil 4 and the tenth coil 10 also have the same phase difference of 180°. Furthermore, among the coils constituting the W-phase coil, the fifth coil 5 and the 11th coil 11 have the same phase difference of 180°, and the sixth coil 6 and the 12th coil 12 also have the same phase difference of 180°.

Since the U-phase coil U is configured by winding the first coil 1, the second coil 2, the seventh coil 7 and the eighth coil 8 in parallel, counter electromotive forces generated by the first and second coils 1 and 2 in the U-phase coil U have a phase difference of 30°, and counter electromotive forces generated by the seventh and eighth coils 7 and 8 also have a phase difference of 30°. Therefore, a circulating current flows along the first and second coils 1 and 2, and a circulating current also flows along the seventh and eighth coils 7 and 8. In this case, since the first and second coils 1 and 2 and the seventh and eighth coils 7 and 8 which are wound in parallel generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the third coil 3, the fourth coil 4, the ninth coil 9 and the tenth coil 10 in parallel, counter electromotive forces generated by the third and fourth coils 3 and 4 in the V-phase coil V have a phase difference of 30°, and counter electromotive forces generated by the ninth and tenth coils 9 and 10 also have a phase difference of 30°. Therefore, a circulating current flows along the third and fourth coils 3 and 4, and a circulating current also flows along the ninth and tenth coils 9 and 10. In this case, since the third and fourth coils 3 and 4 and the ninth and tenth coils 9 and 10 which are wound in parallel generates torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Since the W-phase coil W is configured by winding the fifth coil 5, the sixth coil 6, the 11th coil 11 and the 12th coil 12 in parallel, counter electromotive forces generated by the fifth and sixth coils 5 and 6 in the W-phase coil W have a phase difference of 30°, and counter electromotive forces generated by the 11th and 12th coils 11 and 12 also have a phase difference of 30°. Therefore, a circulating current flows along the fifth and sixth coils 5 and 6, and a circulating current also flows along the 11th and 12th coils 11 and 12. In this case, since the fifth and sixth coils 5 and 6 and the 11th and 12th coils 11 and 12 which are wound in parallel generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

First, a motor apparatus in accordance with a sixth exemplary embodiment of the disclosure will be described.

Figure 18:
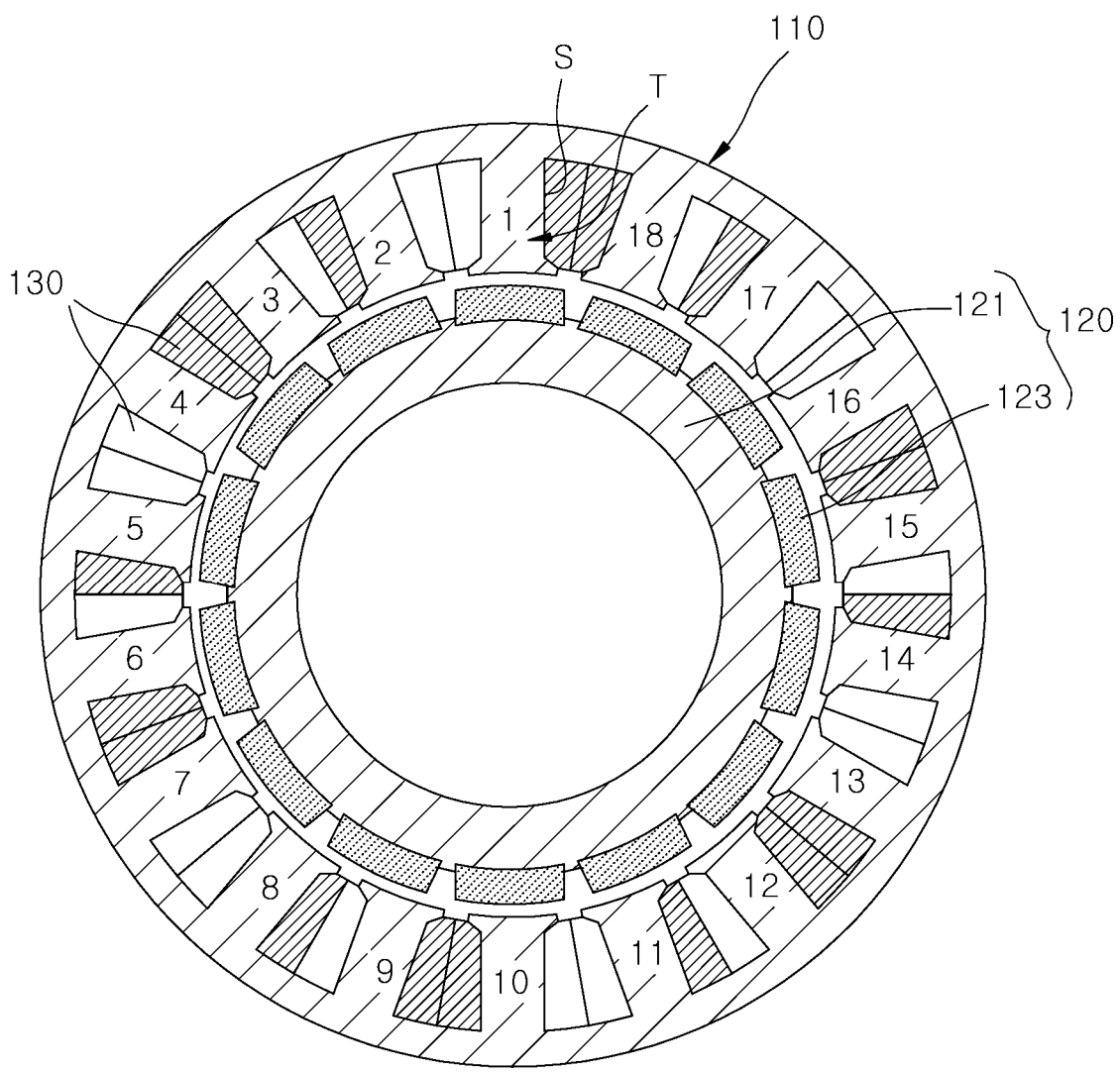
FIG. 18 is a configuration diagram schematically illustrating a motor apparatus in accordance with a sixth exemplary embodiment of the disclosure.
Figure 19:
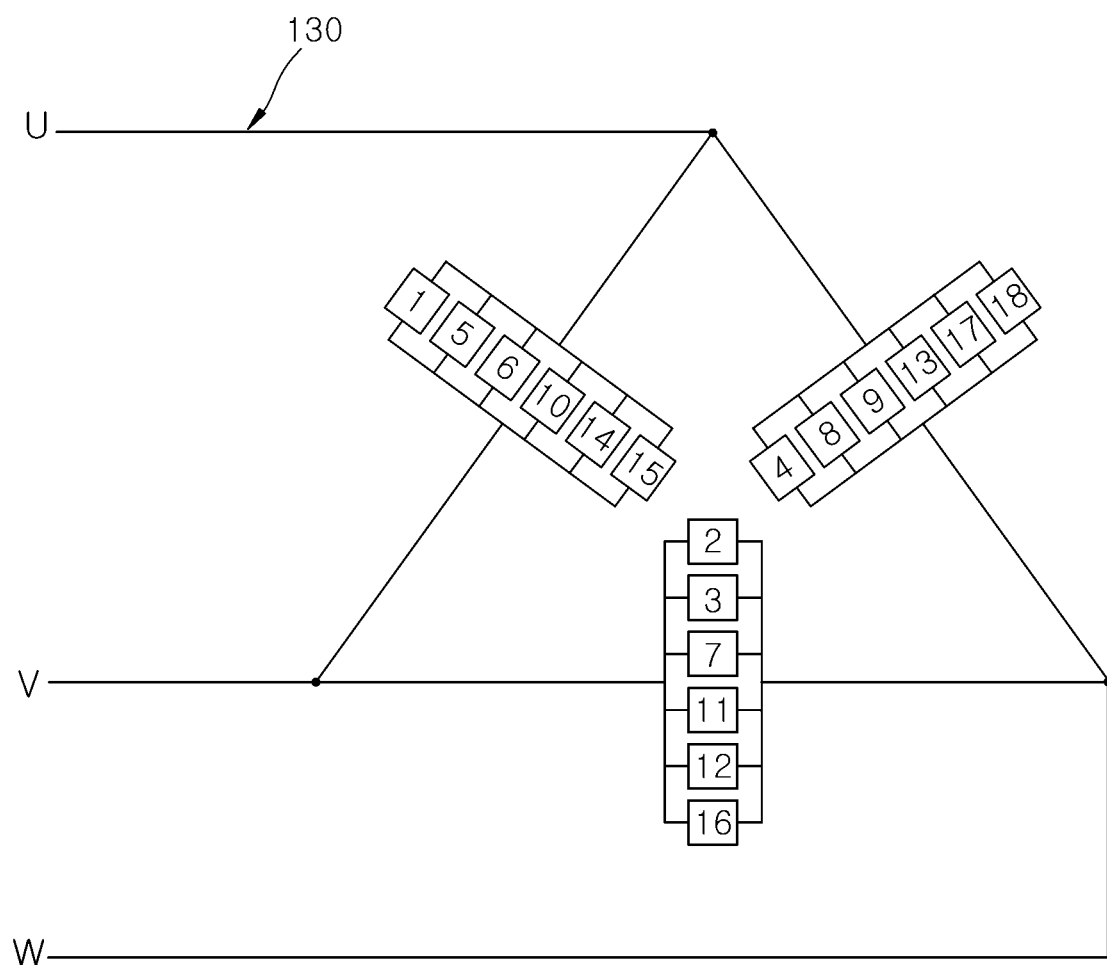
FIG. 19 is a configuration diagram schematically illustrating a connection state of a 3-phase coil part in the motor apparatus in accordance with the sixth exemplary embodiment of the disclosure.

FIG. 18 is a configuration diagram schematically illustrating a motor apparatus in accordance with a sixth exemplary embodiment of the disclosure, FIG. 19 is a configuration diagram schematically illustrating a connection state of a 3-phase coil part in the motor apparatus in accordance with the sixth exemplary embodiment of the disclosure, and FIG. 20 is a table schematically illustrating the connection state of the 3-phase coil part in the motor apparatus in accordance with the sixth exemplary embodiment of the disclosure.

Referring to FIGS. 18 to 20, the motor apparatus in accordance with the sixth exemplary embodiment of the disclosure includes a rotor 120 and a stator 110. The rotor 120 includes 14-pole magnets 123, and the stator 110 includes 18 coils 1 to 18.

A U-phase coil U is configured by winding a first coil 1, a fifth coil 5, a sixth coil 6, a tenth coil 10, a 14th coil 14 and a 15th coil 15 in parallel. A V-phase coil V is configured by winding a second coil 2, a third coil 3, a seventh coil 7, an 11th coil 11, a 12th coil 12 and a 16th coil 16 in parallel. A W-phase coil W is configured by winding a fourth coil 4, an eighth coil 8, a ninth coil 9, a 13th coil 13, a 17th coil 17 and an 18th coil 18 in parallel.

Since the U-phase coil U is configured by winding the first coil 1, the fifth coil 5, the sixth coil 6, the tenth coil 10, the 14th coil 14 and the 15th coil 15 in parallel, counter electromotive forces generated by the fifth and sixth coils 5 and 6 in the U-phase coil U have a phase difference of 30°, and counter electromotive forces generated by the 14th and 15th coils 14 and 15 also have a phase difference of 30°. Therefore, a circulating current flows along the fifth and sixth coils 5 and 6, and a circulating current also flow along the 14th and 15th coils 14 and 15. In this case, since the first coil 1, the fifth coil 5, the sixth coil 6, the tenth coil 10, the 14th coil 14 and the 15th coil 15 which are wound in parallel generate torques in the opposite directions, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the second coil 2, the third coil 3, the seventh coil 7, the 11th coil 11, the 12th coil 12 and the 16th coil 16 in parallel, counter electromotive forces generated by the second and third coils 2 and 3 in the V-phase coil V have a phase difference of 30°, and counter electromotive forces generated by the 11th and 12th coils 11 and 12 also have a phase difference of 30°. Therefore, a circulating current flows through the second and third coils 2 and 3, and a circulating current also flows through the 11th and 12th coils 11 and 12. In this case, since the second coil 2, the third coil 3, the seventh coil 7, the 11th coil 11, the 12th coil 12 and the 16th coil 16 which are wound in parallel generate torques in the opposite directions, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Since the W-phase coil W is configured by winding the fourth coil 4, the eighth coil 8, the ninth coil 9, the 13th coil 13, the 17th coil 17 and the 18th coil 18 in parallel, counter electromotive forces generated by the eighth and ninth coils 8 and 9 in the W-phase coil W have a phase difference of 30°, and counter electromotive forces generated by the 17th and 18th coils 17 and 18 also have a phase difference of 30°. Therefore, a circulating current flows along the eighth and ninth coils 8 and 9, and a circulating current also flows along the 17th and 18th coils 17 and 18. In this case, since the fourth coil 4, the eighth coil 8, the ninth coil 9, the 13th coil 13, the 17th coil 17 and the 18th coil 18 which are wound in parallel generate torques in the opposite directions, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Next, a motor apparatus in accordance with a seventh exemplary embodiment of the disclosure will be described.

Figure 21:
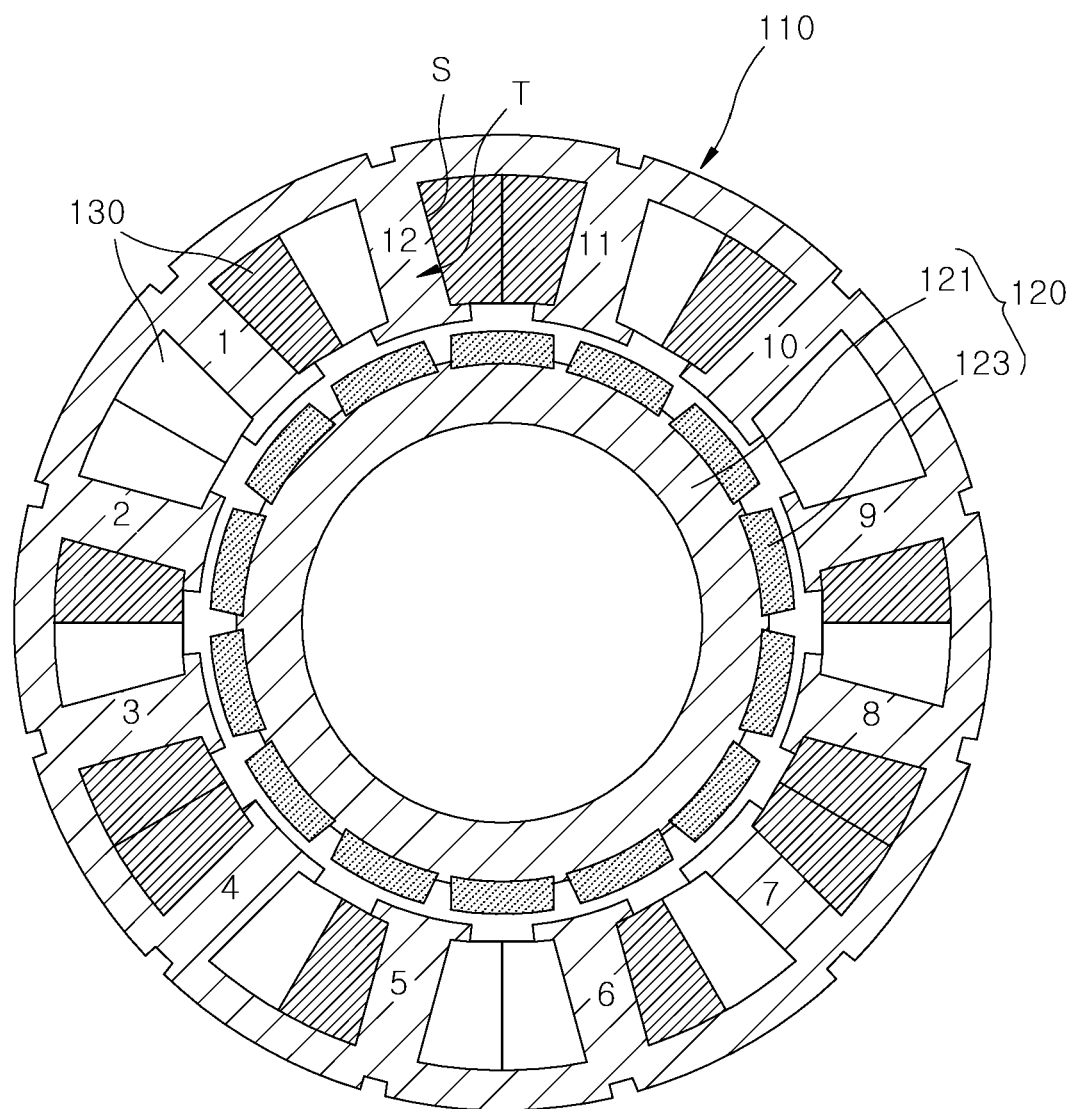
FIG. 21 is a configuration diagram schematically illustrating a motor apparatus in accordance with a seventh exemplary embodiment of the disclosure.
Figures 22, 23:
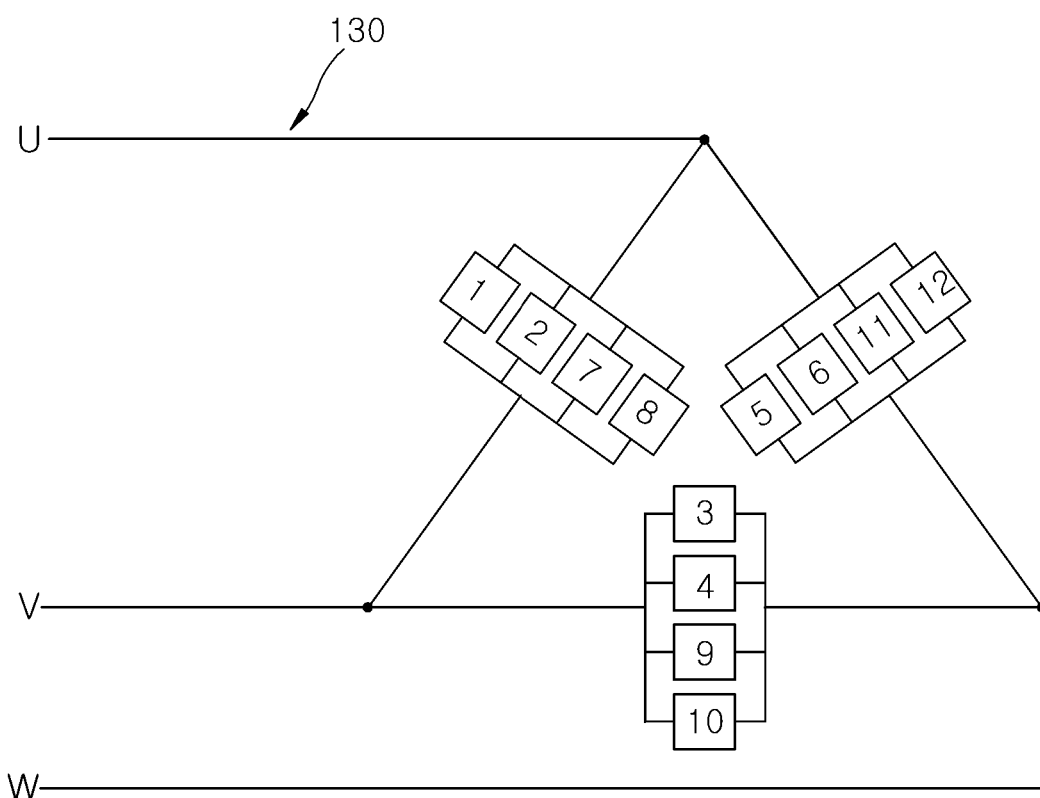
FIG. 22 is a configuration diagram schematically illustrating a connection state of a 3-phase coil part in the motor apparatus in accordance with the seventh exemplary embodiment of the disclosure.
FIG. 23 is a table schematically illustrating the connection state of the 3-phase coil part in the motor apparatus in accordance with the seventh exemplary embodiment of the disclosure.

FIG. 21 is a configuration diagram schematically illustrating a motor apparatus in accordance with a seventh exemplary embodiment of the disclosure, FIG. 22 is a configuration diagram schematically illustrating a connection state of a 3-phase coil part in the motor apparatus in accordance with the seventh exemplary embodiment of the disclosure, and FIG. 23 is a table schematically illustrating the connection state of the 3-phase coil part in the motor apparatus in accordance with the seventh exemplary embodiment of the disclosure.

Referring to FIGS. 21 to 23, the motor apparatus in accordance with the seventh exemplary embodiment of the disclosure includes a rotor 120 and a stator 110. The rotor 120 includes 14-pole magnets 123, and the stator 110 includes 12 coils 1 to 12.

A U-phase coil U is configured by winding a first coil 1, a second coil 2, a seventh coil 7 and an eighth coil 8 in parallel. A V-phase coil V is configured by winding a third coil 3, a fourth coil 4, a ninth coil 9 and a tenth coil 10 in parallel. A W-phase coil W is configured by winding a fifth coil 5, a sixth coil 6, an 11th coil 11 and a 12th coil 12 in parallel.

Since the U-phase coil U is configured by winding the first coil 1, the second coil 2, the seventh coil 7 and the eighth coil 8 in parallel, counter electromotive forces generated by the first and second coils 1 and 2 in the U-phase coil U have a phase difference of 30°, and counter electromotive forces generated by the seventh and eighth coils 7 and 8 also have a phase difference of 30°. Therefore, a circulating current flows along the first and second coils 1 and 2, and a circulating current also flows along the seventh and eighth coils 7 and 8. In this case, since the first and second coils 1 and 2 and the seventh and eighth coils 7 and 8 which are wound in parallel generate torques in the opposite direction, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the third coil 3, the fourth coil 4, the ninth coil 9 and the tenth coil 10 in parallel, counter electromotive forces generated by the third and fourth coils 3 and 4 in the V-phase coil V have a phase difference of 30°, and counter electromotive forces generated by the ninth and tenth coils 9 and 10 also have a phase difference of 30°. Therefore, a circulating current flows along the third and fourth coils 3 and 4, and a circulating current also flows along the ninth and tenth coils 9 and 10. In this case, since the third and fourth coils 3 and 4 and the ninth and tenth coils 9 and 10 which are wound in parallel generate torques in the opposite direction, the counter rotating speed of the rotor 120 can be reduced even though the rotor 120 is counter-rotated by an external force. Furthermore, it is possible to prevent the ECU from being damaged by the counter electromotive force which is generated in the motor apparatus and transferred to the 3-phase terminals.

Since the W-phase coil W is configured by winding the fifth coil 5, the sixth coil 6, the 11th coil 11 and the 12th coil 12 in parallel, counter electromotive forces generated by the fifth and sixth coils 5 and 6 in the W-phase coil W have a phase difference of 30°, and counter electromotive forces generated by the 11th and 12th coils 11 and 12 also have a phase difference of 30°. Therefore, a circulating current flows along the fifth and sixth coils 5 and 6, and a circulating current also flows along the 11th and 12th coils 11 and 12. In this case, since the fifth and sixth coils 5 and 6 and the 11th and 12th coils 11 and 12 which are wound in parallel generate torques in the opposite direction, the counter rotating speed of the rotor 120 can be reduced even though the rotor 120 is counter-rotated by an external force. Furthermore, it is possible to prevent the ECU from being damaged by the counter electromotive force which is generated in the motor apparatus and transferred to the 3-phase terminals.

Next, a motor apparatus in accordance with an eighth exemplary embodiment of the disclosure will be described.

Figure 24:
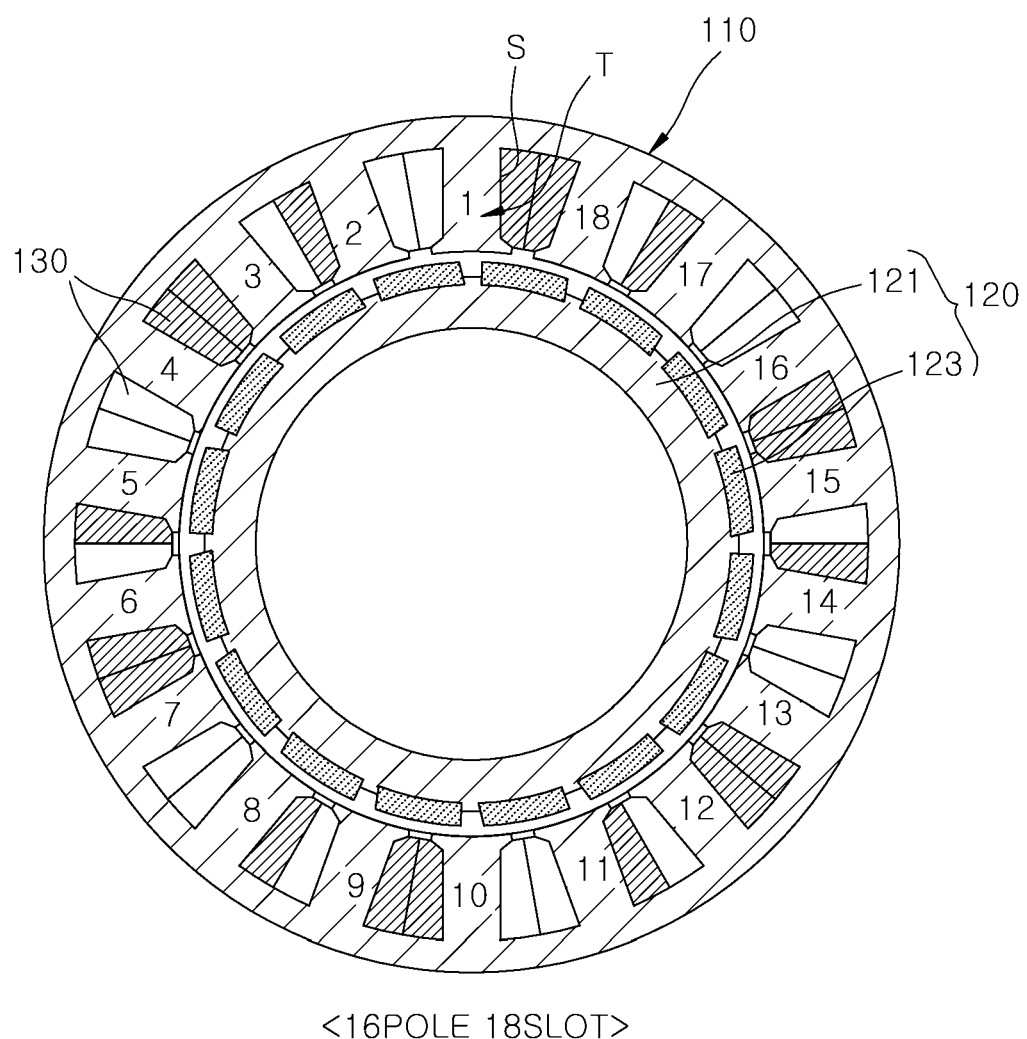
FIG. 24 is a configuration diagram schematically illustrating a motor apparatus in accordance with an eighth exemplary embodiment of the disclosure.
Figure 25:
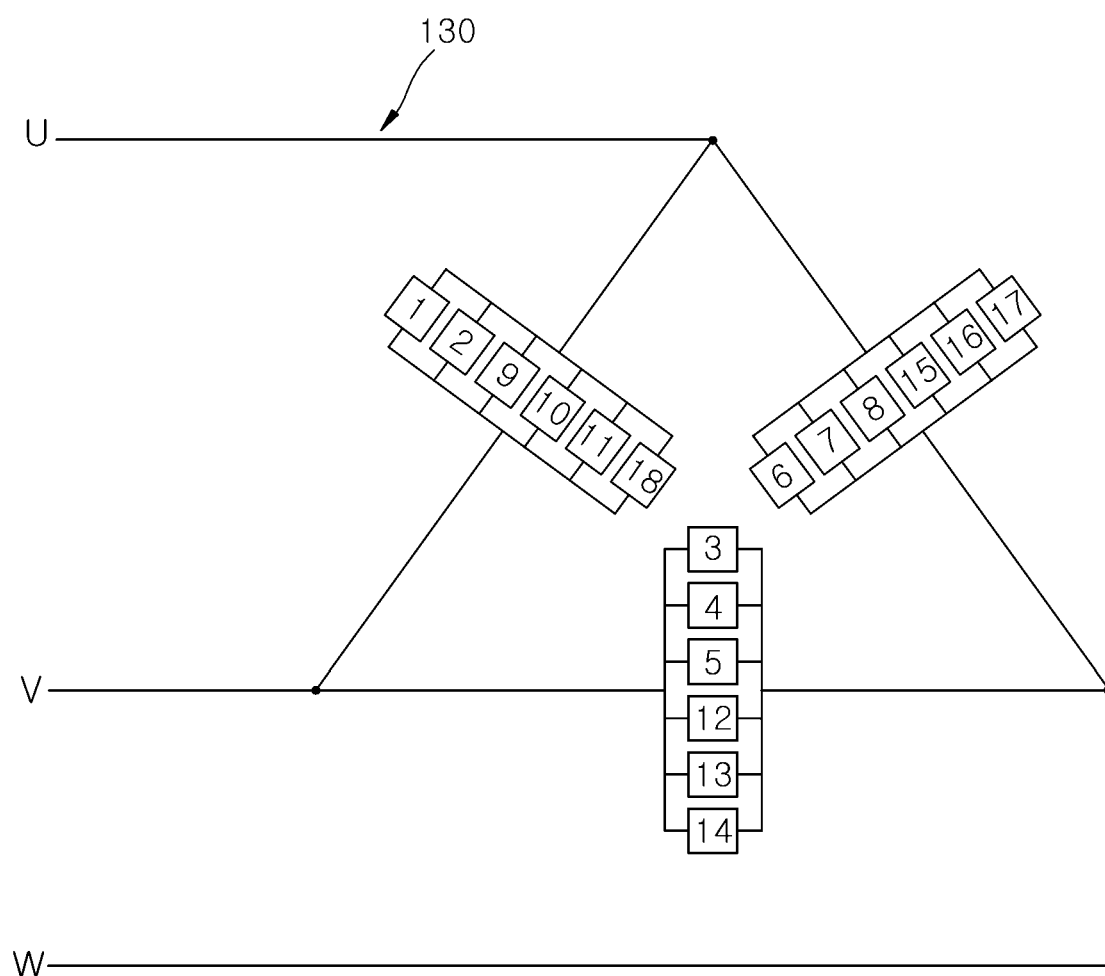
FIG. 25 is a configuration diagram schematically illustrating a connection state of a 3-phase coil part in the motor apparatus in accordance with the eighth exemplary embodiment of the disclosure.

FIG. 24 is a configuration diagram schematically illustrating a motor apparatus in accordance with an eighth exemplary embodiment of the disclosure, FIG. 25 is a configuration diagram schematically illustrating a connection state of a 3-phase coil part in the motor apparatus in accordance with the eighth exemplary embodiment of the disclosure, and FIG. 26 is a table schematically illustrating the connection state of the 3-phase coil part in the motor apparatus in accordance with the eighth exemplary embodiment of the disclosure.

Referring to FIGS. 24 to 26, the motor apparatus in accordance with the eighth exemplary embodiment of the disclosure includes a rotor 120 and a stator 110. The rotor 120 includes 16-pole magnets 123, and the stator 110 includes 18 coils 1 to 18.

A U-phase coil U is configured by winding a first coil 1, a second coil 2, a ninth coil 9, a tenth coil 10, an 11th coil 11 and an 18th coil 18 in parallel. A V-phase coil V is configured by winding a third coil 3, a fourth coil 4, a fifth coil 5, a 12th coil 12, a 13th coil 13 and a 14th coil 14 in parallel. A W-phase coil W is configured by winding a sixth coil 6, a seventh coil 7, an eighth coil 8, a 15th coil 15, a 16th coil 16 and a 17th coil 17 in parallel.

Since the U-phase coil U is configured by winding the first coil 1, the second coil 2, the ninth coil 9, the tenth coil 10, the 11th coil 11 and the 18th coil 18 in parallel, counter electromotive forces generated by the first and second coils 1 and 2 in the U-phase coil U have a phase difference of 30°, and counter electromotive forces generated by the tenth and 11th coils 10 and 11 also have a phase difference of 30°. Therefore, a circulating current flows along the first and second coils 1 and 2, and a circulating current also flows along the tenth and 11th coils 10 and 11. In this case, since the first coil 1, the second coil 2, the ninth coil 9, the tenth coil 10, the 11th coil 11 and the 18th coil 18 which are wound in parallel generate torques in the opposite directions, the counter rotating speed of the rotor 120 can be reduced even though the rotor 120 is counter-rotated by an external force.

Since the counter rotating speed of the rotor 120 is reduced, it is possible to suppress a counter electromotive force from being generated in the motor apparatus. Therefore, it is possible to prevent the ECU from being damaged by the counter electromotive force which is generated in the motor apparatus and transferred to the 3-phase terminals.

Since the V-phase coil V is configured by winding the third coil 3, the fourth coil 4, the fifth coil 5, the 12th coil 12, the 13th coil 13 and the 14th coil 14 in parallel, counter electromotive forces generated by the third and fourth coils 3 and 4 in the V-phase coil V have a phase difference of 30°, and counter electromotive forces generated by the 12th and 13th coils 12 and 13 also have a phase difference of 30°. Therefore, a circulating current flows along the third and fourth coils 3 and 4, and a circulating current also flows along the 12th and 13th coils 12 and 13. In this case, since the third coil 3, the fourth coil 4, the fifth coil 5, the 12th coil 12, the 13th coil 13 and the 14th coil 14 which are wound in parallel generate torques in the opposite directions, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

Since the W-phase coil W is configured by winding the sixth coil 6, the seventh coil 7, the eighth coil 8, the 15th coil 15, the 16th coil 16 and the 17th coil 17 in parallel, counter electromotive forces generated by the sixth and seventh coils 6 and 7 in the W-phase coil W have a phase difference of 30°, and counter electromotive forces generated by the 15th and 16th coils 15 and 16 also have a phase difference of 30°. Therefore, a circulating current flows along the sixth and seventh coils 6 and 7, and a circulating current also flows along the 15th and 16th coils 15 and 16. In this case, since the sixth coil 6, the seventh coil 7, the eighth coil 8, the 15th coil 15, the 16th coil 16 and the 17th coil 17 which are wound in parallel generate torques in the opposite direction, the counter rotating speed of the rotor 120 can be reduced even though the rotor 120 is counter-rotated by an external force. Therefore, it is possible to prevent the ECU from being damaged by the counter electromotive force which is generated in the motor apparatus and transferred to the 3-phase terminals.

In accordance with the exemplary embodiments of the disclosure, since the 3-phase coil part is configured by winding the coils having the preset phase difference in parallel, a circulating current may be generated by a counter electromotive force in the preset coils in case of a fail of the electrical system. Therefore, since torque is generated in the opposite direction of the direction, in which the rotor is rotated by an external force due to a circulating current in the motor apparatus, the rotating speed of the rotor may be reduced.

Furthermore, since the motor apparatus can be prevented from being counter-rotated at high speed, it is possible to reduce a counter electromotive force which is generated in the motor apparatus and transferred to the 3-phase terminals. Therefore, it is possible to prevent an element of the ECU from being damaged by the counter electromotive force generated in the motor apparatus.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:
1. A motor apparatus comprising:
a stator having a plurality of teeth formed in a circumference thereof;
a rotor rotatably installed in the stator, and having a plurality of magnets disposed in a circumference thereof; and
a 3-phase coil part having a plurality of coils wound around the teeth, respectively,
wherein the coils having a preset phase difference are arranged in parallel, wherein:

the 3-phase coil part comprises a U-phase coil, a V-phase coil, and a W-phase coil;

the U-phase coil includes first groups of the coils having a first phase difference arranged in parallel, each of the first groups including the coils having the same phase difference arranged in series;

the V-phase coil includes second groups of the coils having a second phase difference arranged in parallel, each of the second groups including the coils having the same phase difference arranged in series;

the W-phase coil includes third groups of the coils having a third phase difference arranged in parallel, each of the third groups including the coils having the same phase difference arranged in series;

the first phase difference is 20° to 30°, and the coils in each of the first groups mechanically have an angle difference of 180° therebetween and are electrically in-phase;

the second phase difference is 20° to 30°, and the coils in each of the second groups mechanically have an angle difference of 180° therebetween and are electrically in-phase;

the third phase difference is 20° to 30°, and the coils in each of the third groups mechanically have an angle difference of 180° therebetween and are electrically in-phase;

the rotor comprises 14-pole magnets;

the stator comprises 18 coils;

the first groups include, counting consecutively in a counter-clockwise direction on the stator, a first coil and a tenth coil wound in series, a fifth coil and a fourteenth coil wound in series, and a sixth coil and a fifteenth coil wound in series, such that the first-tenth coil set, the fifth-fourteenth coil set, and the sixth-fifteenth coil set are arranged in parallel;

the second groups include, counting consecutively in a counter-clockwise direction on the stator, a second coil and an eleventh coil wound in series, a third coil and a twelfth coil wound in series, and a seventh coil and a sixteenth coil wound in series, such that the second-eleventh coil set, the third-twelfth coil set, and the seventh-sixteenth coil set are arranged in parallel; and the third groups include, counting consecutively in a counter-clockwise direction on the stator, a fourth coil and a thirteenth coil wound in series, an eighth coil and a seventeenth coil wound in series, and a ninth coil and an eighteenth coil wound in series, such that the fourth-thirteenth coil set, the eighth-seventeenth coil set, and the ninth-eighteenth coil set are arranged in parallel.

* * * * *